US010856022B2

(12) United States Patent
Bapna et al.

(10) Patent No.: US 10,856,022 B2
(45) Date of Patent: Dec. 1, 2020

(54) DYNAMICALLY PROVIDING DIGITAL CONTENT TO CLIENT DEVICES BY ANALYZING INSERTION POINTS WITHIN A DIGITAL VIDEO

(71) Applicant: Facebook, Inc., Menlo Park, CA (US)

(72) Inventors: Abhishek Bapna, Mountain View, CA (US); Eric Hsin-Chun Huang, Foster City, CA (US); Shuo Li, Redwood City, CA (US); Weitong Liu, Redwood City, CA (US); Menghan Li, San Jose, CA (US)

(73) Assignee: FACEBOOK, INC., Menlo Park, CA (US)

( * ) Notice: Subject to any disclaimer, the term of this patent is extended or adjusted under 35 U.S.C. 154(b) by 0 days.

(21) Appl. No.: 15/861,235

(22) Filed: Jan. 3, 2018

(65) Prior Publication Data

US 2019/0104331 A1 Apr. 4, 2019

Related U.S. Application Data

(60) Provisional application No. 62/566,696, filed on Oct. 2, 2017.

(51) Int. Cl.
*H04N 21/236* (2011.01)
*G06Q 50/00* (2012.01)
*H04N 21/478* (2011.01)
*H04N 21/472* (2011.01)
*H04N 21/442* (2011.01)
(Continued)

(52) U.S. Cl.
CPC ....... *H04N 21/23617* (2013.01); *G06Q 50/01* (2013.01); *H04N 21/23418* (2013.01); *H04N 21/23424* (2013.01); *H04N 21/44016* (2013.01); *H04N 21/44222* (2013.01); *H04N 21/458* (2013.01); *H04N 21/4532* (2013.01); *H04N 21/4667* (2013.01); *H04N 21/472* (2013.01); *H04N 21/478* (2013.01); *H04N 21/812* (2013.01); *H04N 21/8455* (2013.01)

(58) Field of Classification Search
None
See application file for complete search history.

(56) References Cited

U.S. PATENT DOCUMENTS 10,425,700 B2 * 9/2019 Loheide ............ H04N 21/4884
2002/0016961 A1 * 2/2002 Goode ................. H04N 7/173
725/9

(Continued)

*Primary Examiner* — Jason K Lin
(74) *Attorney, Agent, or Firm* — Keller Jolley Preece

(57) ABSTRACT

The present disclosure is directed toward systems and methods for dynamically providing digital content to client devices at different insertion points of a digital video based on predicted total value of inserting the digital content and predicted engagement loss of inserting the digital content. For example, system and methods described herein determine that an insertion point is approaching in an actively playing digital video. In response, systems and methods identify digital content for insertion at the insertion point. In one or more embodiments, the described systems and methods insert the identified digital content by comparing the predicted total value of inserting the digital content at the insertion point of the digital video and a predicted engagement loss associated with inserting the digital content at the insertion point of the digital video.

20 Claims, 9 Drawing Sheets

(51) Int. Cl.

| | |
|---|---|
| *H04N 21/845* | (2011.01) |
| *H04N 21/44* | (2011.01) |
| *H04N 21/466* | (2011.01) |
| *H04N 21/458* | (2011.01) |
| *H04N 21/45* | (2011.01) |
| *H04N 21/81* | (2011.01) |
| *H04N 21/234* | (2011.01) |

(56) References Cited

U.S. PATENT DOCUMENTS

| | | | |
|---|---|---|---|
| 2009/0106104 A1* | 4/2009 | Upendran | G06Q 30/0252 705/14.5 |
| 2009/0217318 A1* | 8/2009 | VerSteeg | G06Q 30/02 725/32 |
| 2013/0205314 A1* | 8/2013 | Ramaswamy | H04N 21/44218 725/14 |
| 2017/0127107 A1* | 5/2017 | Kar | H04N 21/2668 |
| 2017/0257669 A1* | 9/2017 | Liu | H04N 21/2668 |
| 2018/0007405 A1* | 1/2018 | McLean | G06Q 30/0277 |
| 2018/0084291 A1* | 3/2018 | Wei | H04N 21/812 |

\* cited by examiner

DYNAMICALLY PROVIDING DIGITAL CONTENT TO CLIENT DEVICES BY ANALYZING INSERTION POINTS WITHIN A DIGITAL VIDEO

CROSS REFERENCE TO RELATED APPLICATIONS

The present application claims priority from U.S. Provisional Application No. 62/566,696 filed Oct. 2, 2017. The aforementioned application is hereby incorporated by reference in its entirety.

BACKGROUND

Developers have recently made significant advances in the technical field of digital content distribution via computer networks. Indeed, developers have created both software and hardware solutions that select and provide, in real-time, targeted digital content from a variety of publishers to individual client devices as those client devices dynamically access different websites, applications, or remote servers. Indeed, recently, developers have generated systems that dynamically select targeted digital content to provide to client devices when client devices access digital videos.

Although conventional digital content systems can select and provide targeted digital content to client devices, such systems have a number of shortcomings. For example, conventional digital content systems are often inflexible, imprecise, and inefficient. For example, conventional digital content systems typically detect a client request for a digital video and then reflexively provide digital content at the outset of the digital video. Although this approach provides digital content from publishers to client devices, it provides a rigid and imprecise solution. Indeed, many conventional systems that employ this technical approach drive users of client devices to other environments, where they are not forced to wade through digital content prior to viewing a digital video. Moreover, conventional systems that employ this technical approach inefficiently exhaust computer resources by processing unnecessary digital visual content. For example, conventional systems that automatically provide digital content prior to a digital video generally process both the digital content and the digital video for viewing by a client device, even though many client devices are driven from the conventional system when presented with digital content (e.g., before viewing the digital video).

These and other problems exist with regard to conventional digital content distribution systems.

BRIEF SUMMARY

One or more embodiments described herein provide benefits and/or solve one or more of the foregoing or other problems in the art with systems, methods, and non-transitory computer readable media for dynamically and flexibly providing digital content to client devices at different insertion points of a digital video based on a predicted total value of inserting the digital content and predicted engagement loss of inserting the digital content. For example, in one or more embodiments, the systems described herein analyze one or more insertion points within a digital video and predict a total value of inserting digital content from a digital content provider at the one or more insertion points. Furthermore, the systems described herein can analyze the one or more insertion points and predict an engagement loss resulting from inserting the digital content at the one or more insertion points. By comparing the predicted total value and the predicted engagement loss, the disclosed systems can dynamically select insertion points within the digital video and provide digital content to client devices at the selected insertion points. In this manner, the disclosed systems can flexibly provide digital content at various points in a digital video while precisely targeting insertion points that are most likely to improve retention/engagement and efficiently utilizing computing resources to process digital content.

Additional features and advantages of the present application will be set forth in the description as follows, and in part will be obvious from the description, or may be learned by the practice of such exemplary embodiment. The features and advantages of such embodiments may be realized and obtained by means of the instruments and combinations particularly pointed out in the appended claims. These and other features will become more fully apparent from the following description and appended claims, or may be learned by the practice of such exemplary embodiments as set forth hereinafter.

BRIEF DESCRIPTION OF THE DRAWINGS

Various embodiments will be described and explained with additional specificity and detail through the use of the accompanying drawings, in which.

DETAILED DESCRIPTION

Figure 1:
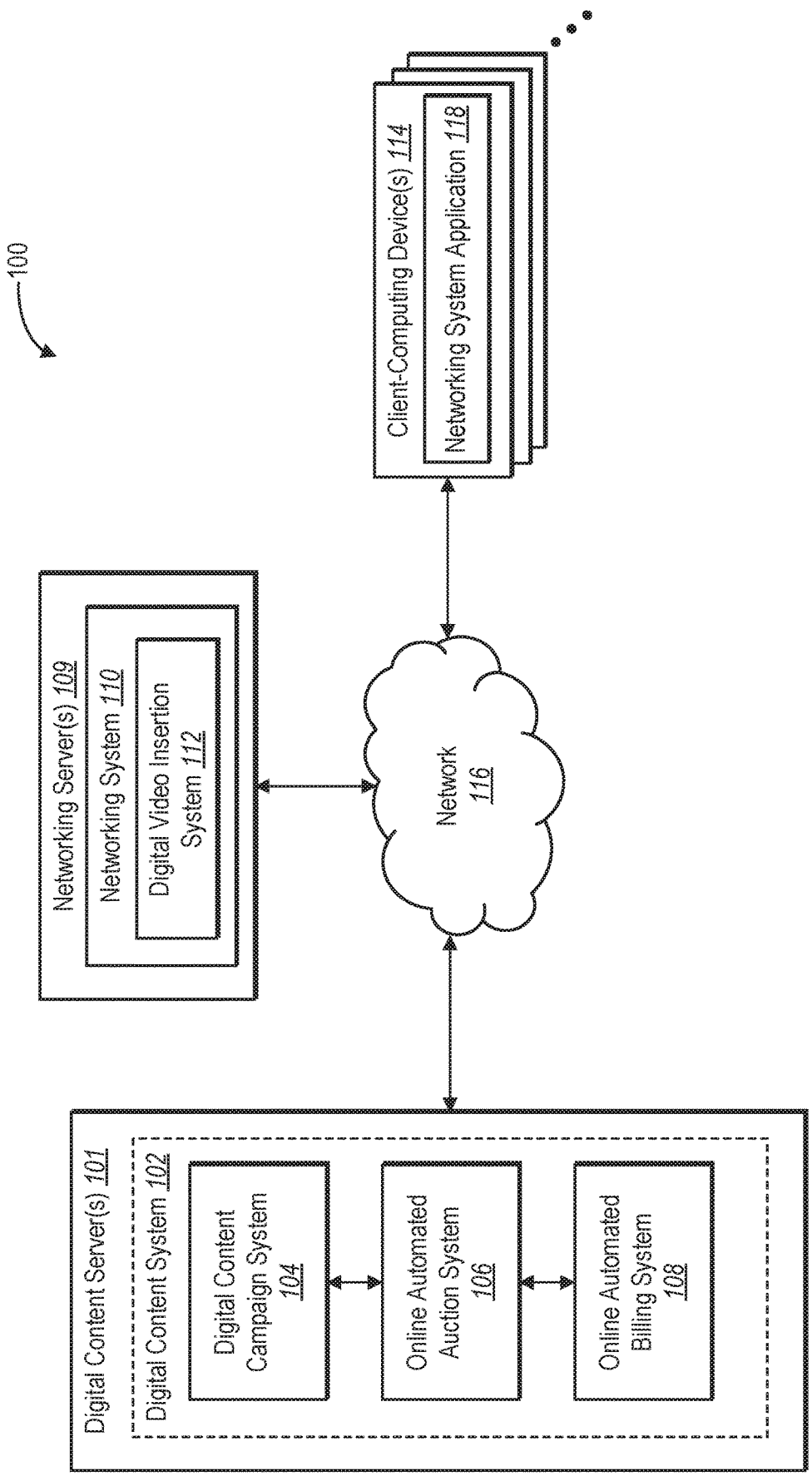
FIG. 1 illustrates an environmental diagram of a digital video insertion system in accordance with one or more embodiments.

One or more embodiments disclosed herein include a digital video insertion system that dynamically provides digital content to client devices at various insertion points of a digital video. In particular, in one or more embodiments, the digital video insertion system provides digital content at an insertion point of a digital video in response to determining (in real-time as a user watches a digital video) that the total value of the digital content outweighs the predicted engagement loss associated with inserting the digital content at the insertion point. Furthermore, in one or more embodiments, if the digital video insertion system determines that the total value of the digital content does not outweigh the predicted engagement loss, the digital video insertion system will not insert the digital content into the digital video. Accordingly, the digital video insertion system can flexibly insert digital content within a digital video, in real-time, while precisely targeting insertion points that are most likely to improve overall value. In doing so, the digital video insertion system considers not only characteristics of the user and the distributed digital content, but also accounts characteristics of the host digital video and particular insertion points within the host digital video, thus, adding a third dimension to intelligent digital content distribution.

To illustrate, in one or more embodiments, the digital video insertion system determines that a client-computing device is actively playing a digital video (e.g., a digital video with an insertion point). While the client-computing device is actively playing a portion of the digital video before the insertion point, the digital video insertion system can identify digital content for the insertion point of the digital video and perform a comparison between a predicted total value of the digital content and a predicted engagement loss associated with providing the digital content at the insertion point. Based on the comparison, the digital video insertion system can provide for display to the client-computing device the digital content at the insertion point of the digital video.

The present digital video insertion system provides various technological advantages over conventional digital content systems. For example, as mentioned above, the digital video insertion system improves flexibility. Indeed, although conventional digital content systems rigidly provide digital content at the beginning of digital videos, the digital video insertion system can dynamically analyze insertion points at various points within a digital video. Moreover, the digital video insertion system can perform in real-time (i.e., analyze insertion points and provide digital content while a client computing device is actively playing a digital video). Accordingly, the digital video insertion system allows for flexible, real-time selection of various insertion points within a digital video to provide digital content at a client-computing device across a computer network.

In addition, the digital video insertion system improves precision and accuracy relative to conventional digital content systems. Indeed, rather than bluntly providing digital content at the outset of a digital video, the digital video insertion system can provide digital content at a particular insertion point that is likely to improve retention and overall value (based on the specific user, digital content, digital video, and insertion point at issue). For example, the digital video insertion system can select an insertion point to provide digital content based on a predicted organic value that reflects a measure of improved user sentiment resulting from inserting the digital content at the insertion point of the digital video. Thus, the digital video insertion system can provide digital content at an insertion point of a digital video precisely tailored to improve user sentiment and total value.

Furthermore, the digital video insertion system improves efficiency of implementing computing devices. As mentioned above, conventional systems process digital content and digital videos for client devices that request access to any digital video. The digital video insertion system can conserve computing resources by providing a digital video and then providing digital content based on a tailored analysis to particular insertion points. Thus, the digital video insertion system need not process or transmit digital content in circumstances where the user closes the digital video after a short period of time. Similarly, the digital video insertion system need not process digital content in circumstances where the engagement loss exceeds the total value. Accordingly, the digital video insertion system efficiently conserves system resources in circumstances where conventional systems unnecessarily analyze and process digital content. Additionally, the digital video insertion system can avoid wasting computing resources by only providing truly valuable digital content to a client-computing device.

To illustrate features of the digital video insertion system, in one or more embodiments, networking system users access digital videos via a networking system, and the digital video insertion system inserts digital content in to networking system content. For example, the digital video insertion system can provide digital videos to a networking system user as part of the user's networking system newsfeed, as part of a networking system display framework (e.g., within side banners and headers of a graphical user interface), or through a series of dedicated digital video graphical user interfaces (e.g., where the user can explore and watch different digital videos).

In one or more embodiments, the digital video insertion system inserts digital content into a digital video at an insertion point. For example, in response to a digital video provider making a new digital video available via the networking system, the digital video insertion system can configure one or more insertion points in the digital video. In at least one embodiment, the digital video insertion system configures an insertion point in the digital video by earmarking a point between two image frames (e.g., a point that is past a certain number or percentage of image frames of an initial portion or a predetermined number of seconds into the digital video). In at least one embodiment, the digital video insertion system can add insertion points to the digital video at predetermined intervals.

In one or more embodiments, the digital video insertion system detects a client-computing device playing a digital video, and in response, begins the process of inserting digital content into the digital video. For example, in response to detecting a client computing device providing a digital video for display, the digital video insertion system can track the playback position of the digital video. In at least one embodiment, once the playback position of the digital video is within a threshold period of time from an insertion point (e.g., within 10 seconds of the insertion point), the digital video insertion system identifies digital content for the insertion point (e.g., identifies digital content via an online automated auction amongst various digital content providers).

Upon identifying digital content to insert at the insertion point, the digital video insertion system determines whether to insert the digital content into the digital video playing on the client-computing device. For example, the digital video insertion system can analyze various characteristics of the digital content, the user, and the digital video and determine that the predicted total value of the digital content is greater than or equal to the predicted engagement loss associated with inserting the digital content into the digital video. In response, the digital video insertion system can insert the digital content in the digital video.

The digital video insertion system can predict total value of inserting digital content at an insertion point. For example, in one or more embodiments, the digital video insertion system generates the predicted total value of the digital content based on predicted revenue that the digital content will generate (e.g., revenue for the digital content provider and/or others implementing the networking system). The digital video insertion system can also generate predicted total value of the digital content can based on a predicted organic value (e.g., a predicted sentiment value that the digital content represents for a user). Thus, the predicted total value can reflect direct monetary income and other benefits (e.g., benefits to users) resulting from providing digital content at a particular insertion point.

As mentioned above, in one or more embodiments, the digital video insertion system also determines a predicted engagement loss associated with inserting the digital content into the digital video. For example, the digital video insertion system can determine the predicted engagement loss based on a prediction of whether the user of the client-computing device will finish watching all (or a portion of) the digital content. Furthermore, the digital video insertion system can determine the predicted engagement loss based on a predicted value of any remaining portion of the digital video following the digital content that will be lost if the user stops playback while watching the digital content.

In one or more embodiments, the digital video insertion system determines that the predicted engagement loss associated with inserting digital content into a digital video is less than the total value of the digital content. In response to this determination, the digital video insertion system can withhold the digital content from insertion into the digital video. In this manner, the digital video insertion system can avoid providing digital content in inefficient and invaluable insertion points of a digital video.

The digital video insertion system can also repeatedly analyze different insertion points as a client-computing device plays a digital video. For example, the digital video insertion system can repeat the process described above each time playback of a digital video on a computer-client device is within a threshold amount of time from any insertion point in the digital video. Accordingly, the digital video insertion system can provide digital content at insertion points that are most likely to increase total value and reduce loss of users.

In addition, in at least one embodiment, the digital video insertion system collects playback information (e.g., information regarding what the client-computing device played after receiving the digital content and/or at what point the user stopped playback). In particular, the digital video insertion system can collect playback information and utilize the playback information to predict user behaviors. For example, based on playback information collected form client-computing devices, the digital video insertion system can train one or more machine learning models to aid in predicting user behaviors, such as digital content completion rates and/or digital video watch time loss.

As mentioned above, in one or more embodiments, the digital video insertion system is implemented within an environment that includes various computing devices and components. FIG. 1 illustrates a schematic diagram of an environment 100 in which an exemplary digital video insertion system 112 may be implemented in accordance with one or more embodiments. As shown, the environment 100 includes a digital content server(s) 101 hosting a digital content system 102 including one or more of a digital content campaign system 104, an online automated auction system 106, and an online automated billing system 108. Moreover, as illustrated, the environment 100 includes a networking server(s) 109 hosting a networking system 110 including the digital video insertion system 112, as well as one or more client-computing device(s) 114 including networking system applications 118.

The digital content system 102, the networking system 110, and the one or more client-computing device(s) 114 communicate via a network 116, which may include one or more networks and may use one or more communication platforms or technologies suitable for transmitting data and/or communication signals. In one or more embodiments, the network 116 includes the Internet or World Wide Web. The network 116, however, can include various other types of networks that use various communication technologies and protocols, such as a corporate intranet, a virtual private network ("VPN"), a local area network ("LAN"), a wireless local network ("WLAN"), a cellular network, a wide area network ("WAN"), a metropolitan area network ("MAN"), or a combination of two or more such networks. Additional details relating to the network 116 are explained below with reference to FIG. 6.

As shown in FIG. 1, the environment 100 includes the digital content system 102. In one or more embodiments, the digital content system 102 (e.g., an advertising system) handles all activities involved in selecting and providing digital content to the digital video insertion system 112. As shown, the digital content system 102 is implemented by one or more servers, which may generate, store, receive, and transmit any type of data. For example, the one or more servers may transmit data to the networking system 110. In one example embodiment, the digital content system 102 is implemented on one or more content servers. In additional or alternative embodiments, the digital content system 102 can also be implemented on one or more web-hosting servers.

Moreover, as illustrated in FIG. 1, the digital content system 102 includes one or more of the digital content campaign system 104, the online automated auction system 106, and the online automated billing system 108. As an overview, the digital content campaign system 104 manages digital content distribution campaigns (e.g., advertising campaigns) and serves digital content to the digital video insertion system 112 via the networking system 110. The online automated auction system 106 facilitates online auctions between different digital content distribution campaigns. Moreover, the online automated billing system 108 collects actual revenue attributable to (e.g., billed to or able to be billed to) a digital content provider (e.g., an advertiser, a promoter) and reports billing information back to the digital content campaign system 104. Each of the digital content campaign system 104, the online automated auction system 106, and the online automated billing system 108 can be located on the same or different servers.

As used herein, the term "digital content" refers to one or more digital content items that are transmitted over a communication network (e.g., the Internet or an intranet). In particular, digital content includes digital video, digital text, digital images, digital audio, and digital audiovisual content. For instance, digital content can include a digital video that promotes a product, service, or other offering by a digital content provider (e.g., an advertiser).

As used herein, the term "digital content distribution campaign" refers to a series of actions, rules, and/or processes for disseminating one or more digital content items. In particular, a digital content distribution campaign includes one or more digital content items (e.g., advertisements) and one or more campaign parameters for disseminating the one or more digital content items. To illustrate, a digital content distribution campaign includes a digital content item together with campaign parameters for bidding on impression opportunities, sending digital content items to client-computing devices, or targeting particular client-computing devices and/or networking system users.

Also as used herein, the term "campaign parameters" includes factors, rules, or criteria that define the conditions or operation of a digital content distribution campaign. For example, campaign parameters can include (but are not limited to) campaign objectives (e.g., views, traffic, exposure, impressions, clicks, downloads, lead generations, shares, app installs, conversions, or sales), the budget to the digital content provider (e.g., the advertiser) is willing to spend on a digital content distribution campaign (e.g., daily budget and lifetime budgets), bidding preferences (e.g., maximum bid values, minimum bid values, or bid variations), targeting parameters (e.g., characteristics of networking system users, client-computing devices, locations, or digital media to target with a digital content item), the duration and schedule of the campaign, and/or the read of the campaign.

Also shown in FIG. 1, the environment 100 includes the networking system 110. In one or more embodiments, the networking system 110 provides posts, communications, comments, digital images, digital videos, and other types of networking system content to one or more networking system users (e.g., by way of a digital video display, a newsfeed, a communication thread, a timeline, a "wall," or any other type of graphical user interface presented via the networking system application 118 installed on the client-computing device(s) 114). For example, one or more embodiments provide a user with a networking system newsfeed containing posts from one or more co-users associated with the user (e.g., the user's "friends"). In another example embodiment, the networking system 110 provides the user with a digital video graphical user interface including a listing of one or more digital videos.

In one or more embodiments, a networking system user scrolls through his or her networking system newsfeed in order to view recent networking system posts submitted by the one or more co-users associated with the user via the networking system 110. In one embodiment, the networking system 110 organizes the networking system posts chronologically in a user's networking system newsfeed or wall. In alternative embodiments, the networking system 110 organizes the networking system posts geographically, by interest groups, according to a relationship coefficient between the user and the co-user, etc.

The networking system 110 also enables the user to engage in other types of networking system activity. For example, the networking system 110 enables a networking system user to watch digital videos. In one or more embodiments, the networking system 110 provides one or more digital videos via one or more graphical user interfaces. In response to a detected selection of a provided digital video (e.g., via a networking system application 118 on a client-computing device 114), the networking system 110 provides a playback control that plays the digital video in its entirety.

As further shown in FIG. 1, the networking system 110 includes the digital video insertion system 112. In one or more embodiments, the digital video insertion system 112 configures insertion points in digital videos, determines whether to provide digital content for insertion at an insertion point, and provides digital content for insertion in response to this determination. The digital video insertion system 112 is described in greater detail below.

In one or more embodiments, the client-computing device(s) 114 can be one of various types of computing devices. For example, the client-computing device(s) 114 may include a mobile device such as a mobile telephone, a smartphone, a PDA, a tablet, or a laptop. Additionally, or alternatively, the client-computing device(s) 114 may include a non-mobile device such as a desktop computer, a server, or another type of computing device.

In one or more embodiments, as shown in FIG. 1, the client-computing device(s) 114 include a networking system application 118 associated with the networking system 110. For example, the networking system application 118 enables the users of the client-computing device(s) 114 to view and interact with networking system content, to watch digital videos, and to submit digital videos, posts, and other content to other users via the networking system 110.

Although FIG. 1 illustrates a particular number and arrangement of the client-computing device(s) 114, the networking system 110, and the digital content system 102, in additional embodiments, the client-computing device(s) 114 may directly communicate with the networking system 110, bypassing the network 116. Additionally, in some embodiments, the digital content system 102 can communicate directly with the networking system 110, bypassing the network 116. Additional details with respect to the client-computing device(s) 114 are discussed below with respect to FIG. 5.

Additionally, although FIG. 1 illustrates the networking system 110 and digital content system 102 residing on separate servers (e.g., the networking server(s) 109 and digital content server(s) 101, respectively) with the digital video insertion system 112 implemented via the networking system 110, in some embodiments, the environment 100 utilizes a different arrangement of components. For example, in one or more embodiments, the digital video insertion system 112 can be implemented (in whole or in part) by other components of the environment 100. For example, the digital content system 102 may implement the digital video insertion system 112. Moreover, one or more of the digital content campaign system 104, the online automated auction system 106, or the online automated billing system 108 may implement the digital video insertion system 112.

Furthermore, in at least one embodiment, the networking system application 118 may include the digital video insertion system 112. Additionally, in at least one embodiment, the networking system 110 can include the digital content system 102. Furthermore, in one or more embodiments, the digital content campaign system 104, the online automated auction system 106, and the online automated billing system 108 are implemented via a different arrangement of server devices (e.g., on separate servers).

As mentioned above, in one or more embodiments, the digital video insertion system 112 inserts digital content into digital videos playing on the client-computing device(s) 114 via the networking system application 118. Accordingly, in response to detecting playback of a digital video on a client-computing device 114, the digital video insertion system 112 queries digital content from the digital content system 102. In one or more embodiments, the digital content system 102 provides digital content (e.g., advertisements) based on digital content campaign parameters provided by one or more digital content providers (e.g., advertisers). For example, a digital content provider can specify digital content campaign parameters such as target audience demographics, allocated budget, and maximum bid values. In one or more embodiments, the digital content campaign system 104 receives digital content campaign parameters from a digital content provider and generates a digital content campaign. Moreover, the digital content campaign system 104 can execute the digital content campaign and provide digital content for the digital video insertion system 112 based on the digital content campaign parameters.

Indeed, as mentioned above, in one or more embodiments, the digital video insertion system 112 identifies digital content utilizing an online auction server. To illustrate, the digital content campaign system 104 provides various campaign parameters from the generated digital content campaign to the online automated auction system 106. The online automated auction system 106 determines various metrics associated with the query received from the digital video insertion system 112 (e.g., the type of digital video that includes the insertion point, the placement of the insertion point in the digital video, networking system information associated with the user who is watching the digital video). The online automated auction system 106 then hosts an online automated auction according to the campaign parameters. For example, the online automated auction system 106 generates a bid for each digital content campaign (based on campaign parameters) and identifies a winning bid and a corresponding winning digital content provider.

In one or more embodiments, the online automated auction system 106 identifies a winning bid based on a measure of fit between a digital content item and the user who is watching the digital video. Indeed, in one or more embodiments, the online automated auction system 106 generates total bids that reflects raw bids from digital content providers together with organic bids that reflects a measure of fit (or predicted sentiment improvement) in relation to digital content items and a user. For example, utilizing an organic bid the online automated auction system 106 can identify digital content that is more likely to result in positive user interaction (e.g., watches or clicks) and/or less likely to result in negative reaction from the user (e.g., negative feedback, such as dislikes, negative comments, etc.). In one or more embodiments, the online automated auction system 106 identifies digital content (e.g., generates an organic bid) that aligns with networking system information associated with the user. In at least one embodiment, the online automated auction system generates an organic bid based on whether the digital content corresponds to a topic, interest, subject, event, product, or location that the networking system information indicates is important to the user. Thus, in at least one embodiment, digital video insertion system 112 can identify a winning bid that reflects both a raw bid of the digital content provider and an organic bid that approximates fit or predicted sentiment improvement for a user. Additional detail regarding raw bids and organic bids is provided below in relation to FIG. 3.

Based on the winning bid (and corresponding winning digital content provider), the online automated auction system 106 then provides digital content to the digital video insertion system 112. For example, the online automated auction system 106 identifies digital content from a digital content campaign of the winning digital content provider and provides the digital content to the digital video insertion system 112 in response to the query received from the digital video insertion system 112. Moreover, the digital video insertion system 112 then provides the digital content to the client-computing device(s) 114 by inserting the digital content at an insertion point of the digital video played by the client-computing device(s) 114. Upon inserting the provided digital content into a digital video resulting in a conversion, the online automated billing system 108 can further monitor activity at the client-computing device(s) 114 and bill (e.g., attribute revenue) from the digital content provider to an operator of the networking system 110. For example, in one or more embodiments, the online automated billing system 108 attributes revenue from the digital content provider to an individual or business selling impression opportunities (e.g., opportunities to provide digital content at insertion points) to the digital content provider via the networking system 110.

As mentioned above, the digital video insertion system 112 can also determine whether to insert digital content into a digital video playing at the client-computing device(s) 114. For example, the digital video insertion system 112 can analyze the digital content resulting from the winning bid at the online automated auction system 106 and determine a predicted total value of inserting the digital content at an insertion point of the digital video. Similarly, the digital video insertion system 112 can analyze the digital content and determine a predicted engagement loss associated with inserting the digital content at an insertion point of the digital video. The digital video insertion system 112 can compare the total value and engagement loss and, based on the comparison, provide (or withhold) the digital content.

In circumstances where the digital video insertion system 112 withholds digital content (e.g., where the predicted engagement loss exceeds the predicted total value) the digital video insertion system 112 can perform a variety of actions. In some embodiments, upon determining that predicted engagement less exceeds predicted total value, the digital video insertion system 112 waits until a second insertion point approaches (at the client-computing device(s) 114 playing the digital video). In response to approaching a second insertion point, the digital video insertion system 112 then identifies additional digital content to insert at the second insertion point.

Rather than skipping an insertion point and waiting for a second insertion point, in one or more embodiments, upon determining that a predicted engagement loss exceeds a predicted total value for digital content, the digital video insertion system 112 analyzes a different digital content item. For example, the digital video insertion system 112 can discard digital content associated with an initial winning bid and identify a next winning bid (e.g., the second highest bid at the online automated auction system 106). The digital video insertion system can then identify additional digital content associated with the next winning bid to determine if the additional digital content should be inserted (e.g., if the predicted total value of the additional digital content exceeds the predicted engagement loss). In this manner, the digital video insertion system 112 can analyze multiple different digital content items for any particular insertion point.

As will be described in more detail below, the components of the digital video insertion system 112 can provide, along and/or in combination with the other components, one or more graphical user interfaces ("GUIs"). In particular, the networking system application 118 on the client-computing device(s) 114 can display one or more GUIs generated by the digital video insertion system 112. The digital video insertion system 112 can utilize the networking system application 118 to allow the networking system user of the client-computing device(s) 114 to interact with a collection of display elements within one or more GUIs for a variety of purposes. FIGS. 2A-2E and the description that follows illustrate various example embodiments of the GUIs that are used to describe the various features of the digital video insertion system 112.

Figure 2B:
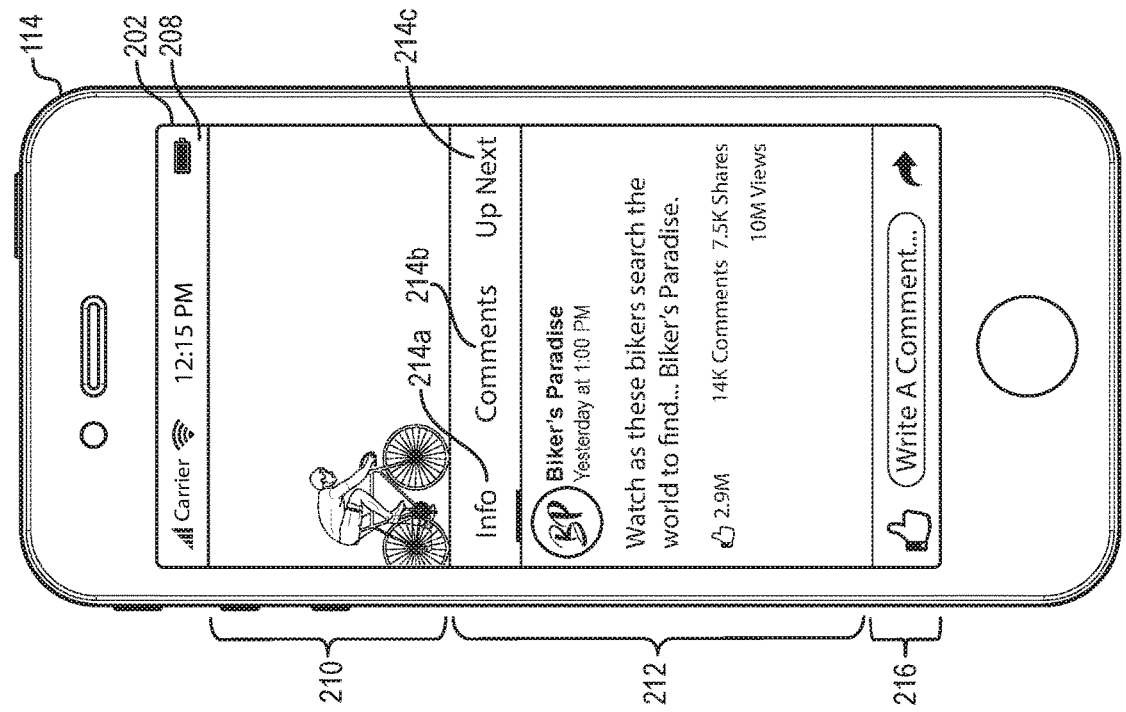
FIGS. 2A-2F illustrate a series of graphical user interfaces displayed via client-computing device(s) in accordance with one or more embodiments.
Figure 2A:
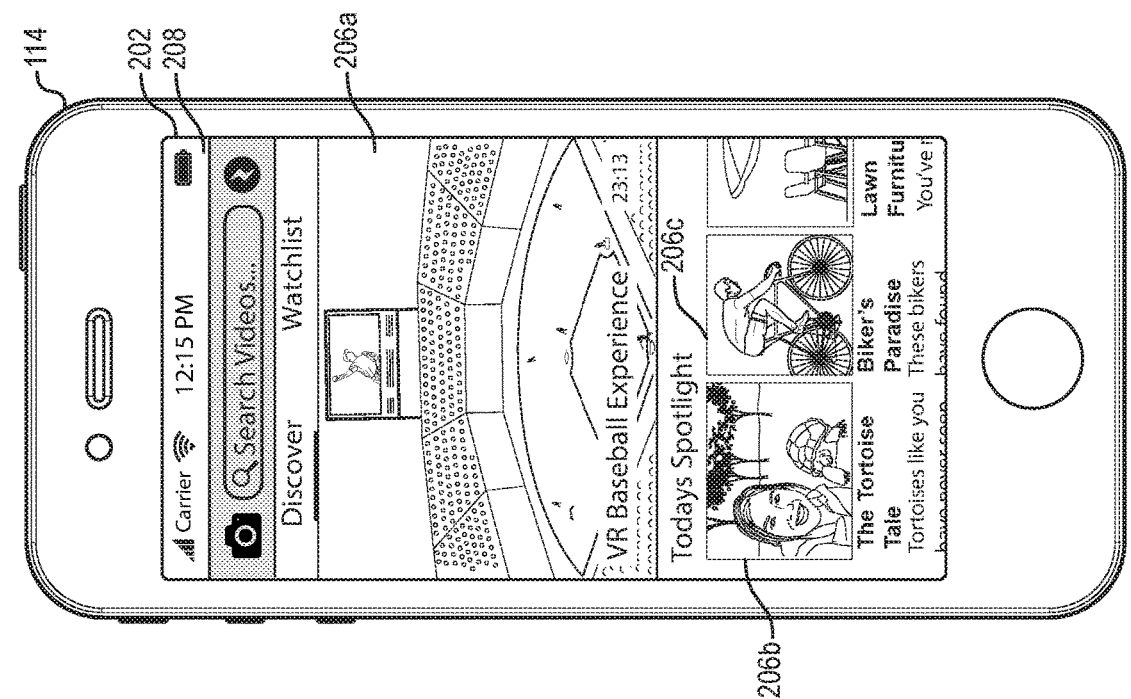

For example, as mentioned above, the digital video insertion system 112 determines whether to insert digital content in a digital video selected for viewing by a networking system user of the client-computing device(s) 114. FIG. 2A illustrates the networking system 110 providing a digital video home GUI 204 on a touch screen display 202 on the client-computing device(s) 114. In one or more embodiments, the digital video home GUI 204 includes one or more digital video selectors 206a-206c. The networking system 110 provides the digital video selectors 206a-206c in response to determining that the user of the client-computing device 114 will likely be interested in the digital videos associated with the digital video selectors 206a-206c. For example, the networking system 110 can provide the digital videos associated with the digital video selectors 206a-206c in response to analyzing networking system activity information associated with the user of the client-computing device 114 and matching the analyzed networking system activity information to metadata and other information associated with one or more digital videos available via the networking system 110.

In response to the user of the client-computing device 114 selecting (e.g., via a tap touch gesture) a digital video selector, the digital video insertion system 112 (via the networking system application 118) can enable playback of the digital video associated with the digital video selector. For example, in response to a detected selection of the digital video selector 206c, the networking system application 118 provides the digital video playback GUI 208, as shown in FIG. 2B. In one or more embodiments, the digital video playback GUI 208 includes a playback element 210, an information window 212, information tabs 214a-214c and networking system activity controls 216.

In at least one embodiment, in response to detecting selection of the digital video selector 206c (e.g., initiation of the process of playing the digital video corresponding to the digital video selector 206c), the digital video insertion system 112 can query digital content from the digital content system 102. For example, as discussed above, in response to receiving a query from the digital video insertion system 112, the digital content system 102 provides digital content associated with a winning bid from the online automated auction system 106. In one or more embodiments, the digital video insertion system 112 stores the received digital content for later insertion.

In at least one embodiment, as illustrated in FIG. 2B, the playback element 210 displays (e.g., plays) the digital video associated with the digital video selector 206c. For example, the networking system application 118 can access local memory to play the digital video via the playback element 210 if the digital video is downloaded on the client-computing device 114. Alternatively, the networking system application 118 can stream the digital video directly from a remote server (e.g., the networking system 110) and provide the digital video for display via the playback element 210.

As shown in FIG. 2B, the information window 212 includes information (e.g., a description and/or networking system information) associated with the digital video associated with the digital video selector 206c. In response to a detected selection of the information tab 214b, the networking system 110 can provide a listing of networking system activity (e.g., comments, shares, likes) associated with the digital video playing in the playback element 210. In response to a detected selection of the information tab 214c, the networking system 110 can replace the current digital video in the playback element 210 with a new digital video. The user of the client-computing device 114 can engage in networking system activity (e.g., submit a like, submit a comment, share with one or more co-users) related to the digital video playing in the playback element 210 with the networking system activity controls 216.

Figure 2D:
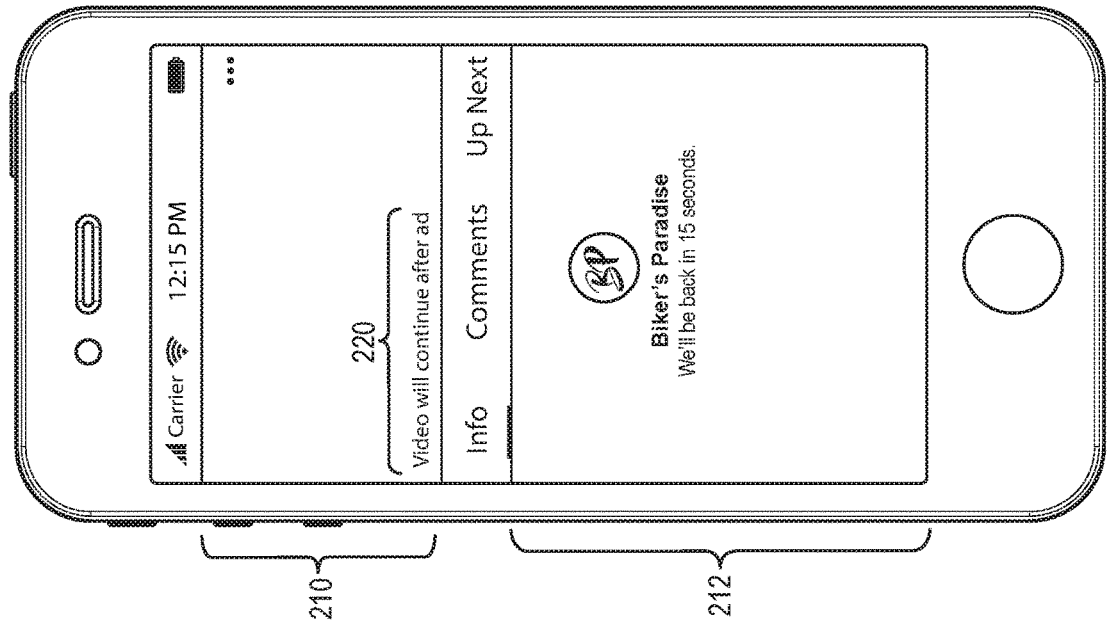
Figure 2C:
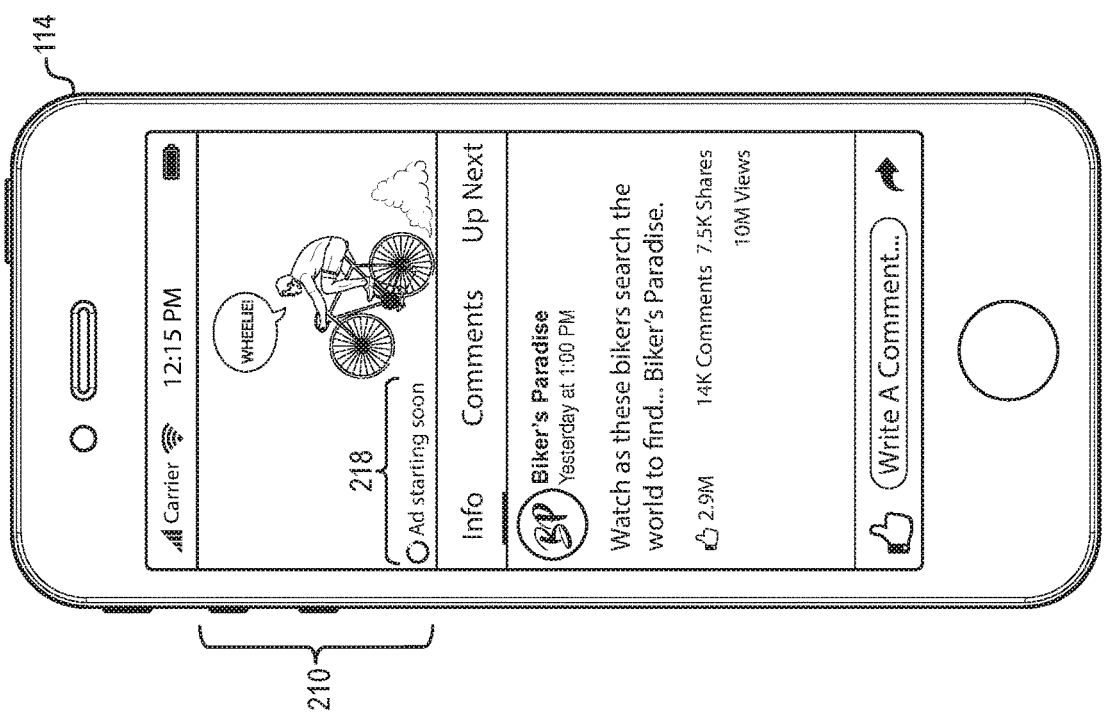

In response to the playback of the digital video approaching an insertion point, the digital video insertion system 112 can provide a notification to the user of the client-computing device 114. For example, as shown in FIG. 2C, the digital video insertion system 112 can provide the starting soon notification 218 in the playback element 210. In one or more embodiments, the starting soon notification 218 informs the user of the client-computing device 114 that a digital content item is about to start playing in the playback element 210 (e.g., the digital video will be interrupted while a digital content item is played).

As mentioned above, in response to detecting an approaching insertion point, the digital video insertion system 112 can also query the digital content system 102 for a digital content item to insert at the insertion point. Indeed, as described above, in one or more embodiments, the digital content system 102 performs an auction to identify a digital content distribution campaign with a winning bid. In one or more embodiments, the digital content provided by the digital content system 102 represents the highest value to digital content provider as well as to an operator of the networking system 110. Additionally, in at least one embodiment, the digital content provided by the digital content system 102 represents the best fit with the networking system user watching the digital video via the playback element 210 on the client-computing device 114.

After receiving the digital content from the digital content system 102, the digital video insertion system 112 determines whether to provide the digital content for insertion in the digital video actively playing in the playback element 210 on the client-computing device 114. As mentioned above, the digital video insertion system 112 determines to provide the digital content for insertion if the predicted total value of the digital content outweighs the predicted engagement loss associated with inserting the digital content in the digital video actively playing in the playback element 210.

As mentioned, in one or more embodiments, the digital video insertion system 112 generates a predicted total value of the digital content. In particular, the digital video insertion system 112 can determine the predicted total value based on the predicted revenue value associated with inserting the digital content at the insertion point and the predicted organic value associated with inserting the digital content at the insertion point.

For example, the digital video insertion system 112 can determine the predicted revenue value associated with the digital content as the predicted revenue from the digital content provider that will result from inserting the digital content into the actively playing digital video. The digital video insertion system 112 can determine the predicted revenue based on historical revenue, based on one or more bids, and/or based on a completion rate. For example, in one or more embodiments, the digital video insertion system 112 determine an amount bid by a digital content provider for placing the digital content at an online auction and then determine a revenue amount from the amount bid.

In some embodiments, the amount bid is dependent upon a user completing the digital content (or based on some other conversion metric). Accordingly, in such circumstances, the digital video insertion system 112 can estimate a revenue value based on a completion rate of the digital content (or some other conversion rate). For example, the digital video insertion system 112 can determine a revenue amount by multiplying a predicted completion rate of the digital content at the insertion point together with a bid amount.

Additionally, as mentioned above, the digital video insertion system 112 can also generate a predicted organic value associated with inserting the digital content at the insertion point. In one or more embodiments, the digital video insertion system 112 generates a predicted organic value that represents a predicted improved sentiment to the user of the client-computing device 114 toward the networking system 110 and/or the digital content provider that will result from inserting the digital content into the actively playing digital video at the insertion point. The digital video insertion system 112 can generate a predicted organic value by analyzing behavior/characteristics of the user and/or behavior/characteristics of other users.

For example, the digital video insertion system 112 can analyze characteristics of the user of the client-computing device 114 and characteristics of the digital content to determine a measure of fit between the user and the digital content. Indeed, the digital video insertion system 112 can utilize a machine learning model (or other algorithm) to analyze user characteristics and digital content characteristics to determine a measure of fit between the user and the digital content. The digital video insertion system 112 can then generate the organic value based on the measure of fit between the user and the digital content.

Similarly, the digital video insertion system 112 can analyze interaction between other users and the digital content to determine organic value. For example, the digital video insertion system 112 can analyze the number of positive and negative interactions between users and the digital content to determine an organic value. To illustrate, the digital video insertion system 112 can determine a number of times users have watched the digital content, clicked on the digital content, or liked the digital content (e.g., positive user interactions) as well as the number of times users have closed the digital content, disliked the digital content, or written negative comments about the digital content (e.g., negative user interactions). The digital video insertion system 112 can then generate an organic value based on the number of positive and/or negative interactions.

Utilizing a predicted revenue value and a predicted organic value, the digital video insertion system 112 can determine a total value associated with inserting digital content at an insertion point. For example, in one or more embodiments, the digital video insertion system 112 adds predicted revenue value and predicted organic value to determine a predicted total value of inserting the digital content at the insertion point of the digital video. Additional detail regarding generating a total value of inserting digital content at an insertion point is provided below in relation to FIG. 3.

As mentioned above, the digital video insertion system 112 can also determine predicted engagement loss associated with inserting the digital content into the digital video actively playing in the playback element 210. In one or more embodiments, the digital video insertion system 112 generates the predicted engagement loss based on a predicted completion rate associated with the digital content and a predicted watch time loss associated with providing the digital content at the insertion point in the actively playing digital video.

For example, in at least one embodiment, the digital video insertion system 112 predicts the completion rate associated with the digital content. To illustrate, the digital video insertion system 112 can predict the completion rate associated with the digital content by analyzing (e.g., via a machine learning model or another algorithm) networking system information associated with the user of the client-computing device 114. For example, the digital video insertion system 112 can analyze whether the user regularly watches digital videos and/or whether the user regularly watches digital content inserted into digital videos.

Moreover, the digital video insertion system 112 can predict the completion rate associated with the digital content by analyzing information associated with other networking system users (e.g., users who have been provided with the same or similar digital content). For example, the digital video insertion system 112 can analyze information associated with other networking system users to determine whether (and at what rate) those users watched digital content after it had been inserted into one or more digital videos. Based on this analysis, the digital video insertion system 112 can then predict the completion rate associated with the digital content.

Additionally, as mentioned above, the digital video insertion system 112 can generate a predicted watch time loss associated with providing the digital content at the insertion point in the actively playing digital video. For example, in one or more embodiments, the digital video insertion system 112 can generate the predicted watch time loss by determining (e.g., by a machine learning model and/or another algorithm) the amount, time, or magnitude of a remaining portion of the digital video following the insertion point. In particular, the digital video insertion system 112 can determine a time of the remaining portion of the digital video that will be lost if the user of the client-computing device 114 exits the playback element 210 (e.g., stops watching the digital video in response to the digital content being inserted). Thus, the digital video insertion system 112 can predict an amount of time that the user of the client-computing device 114 would watch the digital video after the insertion point, if the digital video insertion system 112 does not insert the digital content into the digital video at the insertion point.

In at least one embodiment, the digital video insertion system 112 predicts watch time loss based on the length of the digital video portion following the insertion point, as well as other information associated with the user of the networking system application 118. For example, the digital video insertion system 112 can analyze how well the digital video correlates with the user's networking system activity history. Moreover, the digital video insertion system 112 can analyze other information associated with the digital video to predict watch time loss. For example, the digital video insertion system 112 can generate a predicted watch time loss based on the popularity of the digital video and/or how the digital video is trending among networking system users.

As mentioned above, the digital video insertion system 112 can utilize an expected completion rate and a predicted watch time loss to determine a predicted engagement loss. For example, the digital video insertion system 112 can utilize the completion rate to estimate a likelihood that a user will cancel the digital video as a result of the digital content being inserted into the digital video and multiply the likelihood by the watch time loss to generate a predicted engagement loss. Additional detail regarding generating the predicted engagement loss is provided below in relation to FIG. 3.

Upon determining a predicted total value and a predicted engagement loss, the digital video insertion system 112 can compare the predicted total value and the predicted engagement loss to determine whether to insert digital content at an insertion point of a digital video. In relation to FIGS. 2A-2E, the digital video insertion system 112 determines that the predicted total value exceeds the predicted engagement loss. Accordingly, the digital video insertion system 112 inserts the digital content at the insertion point of the digital video and begins playback of the digital content item.

In one or more embodiments, the digital video insertion system 112 begins the playback of a digital content item by informing the user of the client-computing device 114 that the digital video will continue once the digital content item has completed. For example, as shown in FIG. 2D, in response to determining that the playback element 210 has reached an insertion point in the digital video and that a digital content item should be inserted at that insertion point, the digital video insertion system 112 provides the continuation notification 220 informing the user that the digital video will continue after the digital content item has been viewed. As further shown in FIG. 2D, in response to determining that the digital content item is inserted at the insertion point in the digital video, the networking system 110 can replace the contents of the information window 212 with a statement that playback will return to the digital video after the digital content item is finished.

Figure 2F:
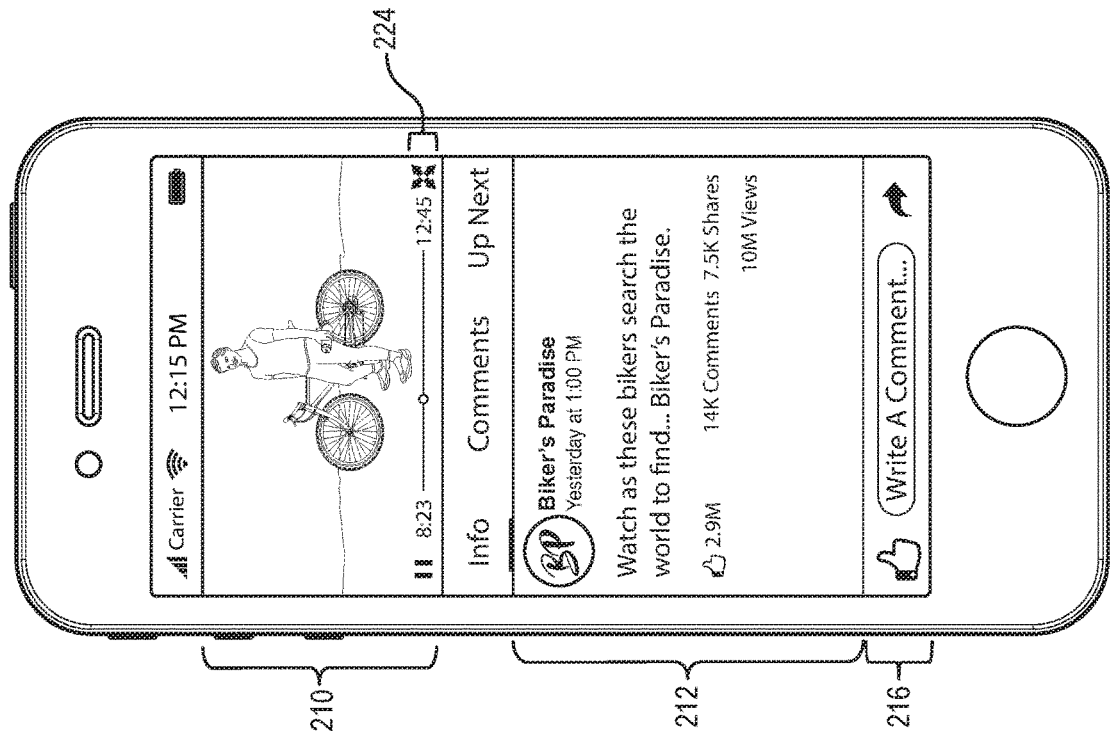
Figure 2E:
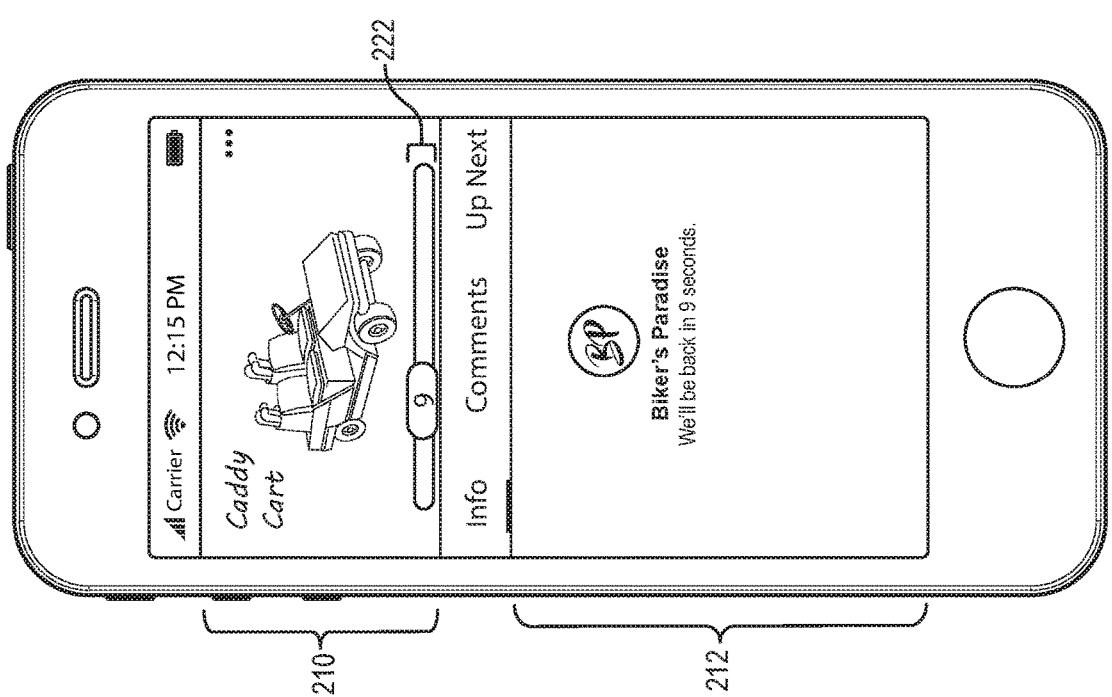

During playback of the inserted digital content item, the digital video insertion system 112 continually updates the playback element 210 with an amount of time remaining in the playback of the digital content item. For example, as shown in FIG. 2E, during playback of the inserted digital content item, the digital video insertion system 112 provides a countdown element 222 associated with the digital content item. In one or more embodiments, the countdown element 222 counts down until the end of playback of the digital content item. As further shown in FIG. 2D, the networking system 110 continually updates the information window 212 to reflect the same countdown.

Upon completion of playback of the digital content item, the playback element 210 returns to playback of the digital video. For example, as shown in FIG. 2F, when playback of the digital content item is complete, the playback element 210 returns to playback of the digital video. Additionally, in some embodiments, in response to returning to playback of the digital video, the playback element 210 includes the playback indicator 224, which displays the amount of playback remaining in the digital video. Furthermore, the networking system 110 includes the original content associated with the digital video in the information window 212, and displays the networking system activity controls 216.

In one or more embodiments, the digital video insertion system 112 monitors playback of the digital content inserted into the digital video actively playing in the playback element 210. For example, if the user of the client-computing device 114 exits the playback element 210 while the digital content is playing, the digital video insertion system 112 collects and utilizes this information. For instance, in one or more embodiments, the digital video insertion system 112 utilizes playback information to train one or more machine learning models that predict completion rates and/or watch time loss (e.g., further described below with reference to FIG. 3).

Similarly, if the client-computing device 114 plays the digital content in its entirety and resumes playing the digital video (i.e., without the user exiting the playback element 210), the digital video insertion system 112 collects and utilizes this information. For instance, as just mentioned, the digital video insertion system 112 can utilize this playback information to train the one or more machine learning models to determine completion rates and/or watch time loss. Thus, user interaction with the digital content and/or the digital video via the client-computing device 114 informs the prediction rates associated with providing future digital content items to the same and other users of the networking system 110.

Figure 3:
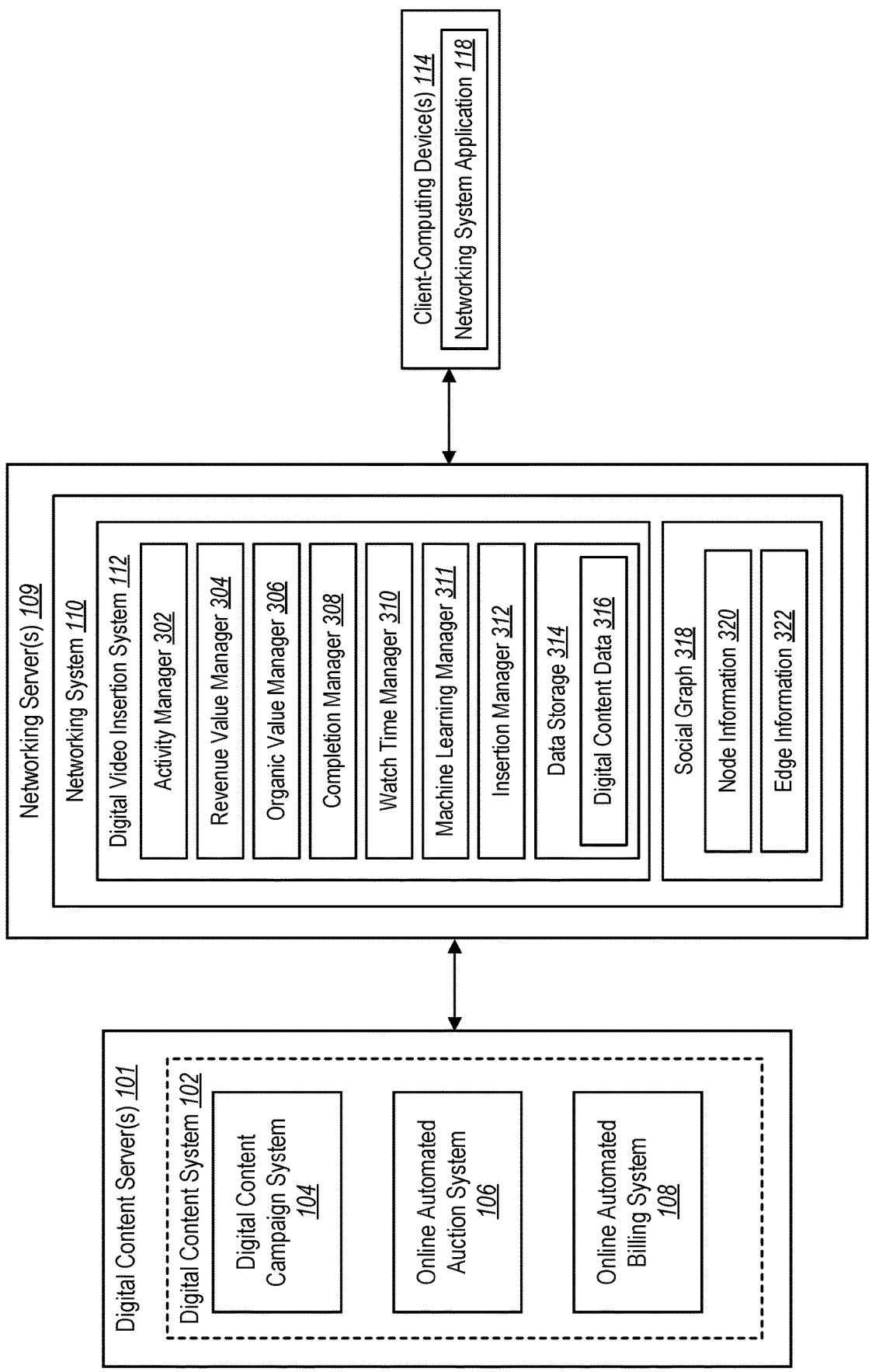
FIG. 3 illustrates a detailed schematic diagram of the digital video insertion system in accordance with one or more embodiments.

FIG. 3 illustrates a schematic diagram illustrating an example embodiment of the digital video insertion system 112. As shown in FIG. 3, the digital video insertion system 112 is implemented by the networking system 110 on the networking server(s) 109. In one or more embodiments, the networking system 110 also includes a social graph 318 including node information 320 and edge information 322. In one or more embodiments, the digital video insertion system 112 includes an activity manager 302, a revenue value manager 304, an organic value manager 306, a completion manager 308, a watch time manager 310, a machine learning manager 311, an insertion manager 312, and a data storage 314 including digital content data 316.

In at least one embodiment, the digital video insertion system 112 accesses the networking system 110 in order to identify and analyze networking system user data. Accordingly, as shown in FIG. 3, the networking system 110 includes the social graph 318 for representing a plurality of users, actions, and concepts. For example, in one or more embodiments, the social graph 318 is accessible by the networking system 110. In one or more embodiments, the social graph 318 includes node information 320 and edge information 322. Node information 320 of the social graph 318 stores information including, for example, nodes for users and nodes for repositories. Edge information 322 of the social graph 318 stores information including relationships between nodes and/or actions occurring within the networking system 110. Further details regarding the networking system 110, the social graph 318, edges, and nodes are presented below with respect to FIGS. 6-7.

Each of the components 304-316 of the digital video insertion system 112 can be implemented using a computing device including at least one processor executing instructions that cause the digital video insertion system 112 to perform the processes described herein. In some embodiments, the components of the digital video insertion system 112 can be implemented by a single server, or across multiple server devices. Additionally or alternatively, a combination of one or more server devices and one or more client devices can implement the components of the digital video insertion system 112. Additionally or alternatively, the components of the digital video insertion system 112 can comprise a combination of computer-executable instructions and hardware.

As mentioned above, and as illustrated in FIG. 3, the digital video insertion system 112 includes the activity manager 302. In one or more embodiments, the activity manager 302 receives information from the client-computing device(s) 114. For example, the activity manager 302 receives information from the client-computing device(s) 114 including networking system activity information such as, but not limited to, viewed networking system posts, a playback position of a digital video being viewed on the client-computing device 114, a total length of a digital video being viewed on the client-computing device 114, comments and likes submitted by the user of the client-computing device 114, and electronic messages sent by the user of the client-computing device 114. In at least one embodiment, the activity manager 302 receives this information from the networking system application 118 in response to detected interactions performed by the user of the client-computing device 114 in connection with one or more graphical user interfaces presented by the networking system application 118 on one or more displays of the client-computing device 114.

The activity manager 302 also sends information and digital content to the client-computing device(s) 114. For example, in one or more embodiments, in response to receiving playback information from the client-computing device 114 (e.g., a playback position of an actively playing digital video in the networking system application 118), the digital video insertion system 112 queries digital content from the digital content system 102, and determines whether the digital content should be inserted in the actively playing digital video, as will be described in greater detail below. In response to the digital video insertion system 112 determining that the digital content should be inserted into the actively playing digital video, the activity manager 302 can provide the digital content for insertion in the digital video to the client-computing device 114.

In one or more embodiments, the activity manager 302 determines when an actively playing digital video on the client-computing device 114 is approaching an insertion point. For example, as will be discussed in greater detail, prior to providing a digital video to the client-computing device, the digital video insertion system 112 configures one or more insertion points in the digital video. As the activity manager 302 receives playback information related to an actively playing digital video from the networking system application 118, the playback information can include an indication that the current playback position is within a threshold length of time from an insertion point. For example, the activity manager 302 can compare the current playback position to the previously configured insertion points in the digital video to determine that an insertion point is approaching.

As described above, among other activities, the digital video insertion system 112 can identify digital content, determine whether to provide digital content, and provide digital content based on that determination. For example, in response to the activity manager 302 determining that an actively playing digital video on the client-computing device 114 is approaching an insertion point, the digital video insertion system 112 generates a query for digital content, and submits the generated query to the digital content system 102. In one or more embodiments, the digital video insertion system 112 generates the query including information about the actively playing digital video (e.g., metadata related to the digital video, the position of the insertion point in the digital video, the maximum insertion length associated with the insertion point), as well as information related to the user of the client-computing device 114 (e.g., networking system activity information indicating the user's likes, hobbies, interests, occupation, demographics). In at least one embodiment, the query can also include information about other similar networking system users, and other similar digital videos.

In response to sending the query, the digital video insertion system 112 receives one or more digital content items from the digital content system 102. For example, as discussed above, the digital video insertion system 112 receive a single digital content item that represents a winning bid from the online automated auction system 106. In at least one embodiment, this digital content item won the auction because it represented the greatest predicted value to the networking system 110, as well as representing the best fit with the networking system information (e.g., likes, interests, and demographics) of the user of the client-computing device 114.

In one or more embodiments, in response to sending the query, the digital video insertion system 112 receives a ranked number of digital content items from the digital content system 102 (e.g., ranked based on bids from the online auction). For example, if the digital video insertion system 112 determines not to insert the top ranked digital content item (e.g., the digital content item associated with the winning bid), the digital video insertion system 112 can perform the same determination for the next top ranked digital content item and so forth. The digital video insertion system 112 can continue this analysis until the digital video insertion system 112 finds a digital content item to insert, analyzes a threshold number of digital content items (e.g., five digital content items), or runs out of digital content items provided by the digital content system 102.

As illustrated in FIG. 3, the digital video insertion system 112 includes a revenue value manager 304. In one or more embodiments, the revenue value manager 304 determines a predicted value, relative to the networking system 110, of inserting the digital content item into a particular digital video at an insertion point. For example, in one or more embodiments, the predicted value of inserting the digital content item into the digital video represents the predicted revenue that the networking system 110 expects the insertion of the digital content item to generate (e.g., the amount the digital content provider will pay the individual or business selling impression opportunities via the networking system 110).

In one or more embodiments, the revenue value manager 304 determines a predicted value associated with a received digital content item by determining a raw bid associated with the digital content item. For example, as discussed above, the digital content system 102 provides the digital content item to the digital video insertion system 112 in response to the digital content item representing a winning bid in the auction conducted by the online automated auction system 106. Thus, in at least one embodiment, the digital content item won the auction by representing a raw bid that was higher than other raw bids associated with one or more losing digital content items.

As used herein, the raw bid represents a dollar amount that a digital content provider is willing to pay. In one or more embodiments, a raw bid can reflect a dollar amount for payment contingent on one or more events. For example, a raw bid can include a dollar amount per conversion that the digital content provider is willing to pay the individual or business selling impression opportunities (e.g., opportunities to provide digital content at insertion points) via the networking system 110. As used herein, a conversion refers to a user interaction in relation to digital content. For example, the term conversion refers to a user interaction corresponding to digital content that an advertiser seeks to encourage and/or track. For instance, a conversion can include purchases or sales, subscriptions, etc. Moreover, conversions can also include clicks; watching a complete video ad; registering; reading reviews; adding an item to a wish list; adding an item to a shopping cart; or engaging in a chat.

For example, a raw bid can include a dollar amount that a digital content provider is willing to pay each time a user of a client-computing device watches the entirety of the digital content item when inserted in a digital video (e.g., a conversion is also referred to as a completion). Accordingly, when the digital content provider expects a digital content item to generate a higher amount of revenue, the digital content provider will associate a higher maximum bid in the campaign parameters associated with the digital content item. Then when the digital content item later comes up for auction, the higher maximum bid enables the digital content item to garner the winning bid and be sent to the digital video insertion system 112 for insertion in a digital video. In one or more embodiments, the revenue value manager 304 determines the raw bid associated with the digital content item by querying raw bid information from the online automated auction system 106.

As such, the revenue value manager 304 can base the predicted revenue value associated with a digital content item solely on the raw bid associated with the digital content item. In additional embodiments, the revenue value manager 304 can also determine the predicted revenue value associated with the digital content item by multiplying the raw bid associated with the digital content item by the expected conversion rate (eCVR) associated with the digital content item (e.g., an expected completion rate). As mentioned above, in some embodiments, the conversion is a networking system user watching the entirety of a digital content item that is inserted in a digital video. Accordingly, in such embodiments, the expected conversion rate associated with a digital content item refers to a number or percentage of times networking system users are expected to watch the entire digital content item out of a number of times that the digital content item is inserted in digital videos available via the networking system 110 (e.g., the expected conversion rate is further discussed below with regard to the completion manager 308). Thus, in some embodiments, the revenue value manager 304 determines the predicted revenue associated with the digital content according to the following equation:

$$\text{Predicted Revenue} = eCVR * \text{Raw Bid}$$

Although, the foregoing example illustrates that the digital video insertion system 112 can calculate conversions based on watching digital content, in one or more embodiments, the digital video insertion system 112 can calculate conversions based on other types of user interactions. For example, in some embodiments, the digital video insertion system 112 can calculate insertions based on clicks (e.g., clicks on a banner ad presented while the digital content item is playing), on view-throughs (e.g., later visits to a digital content provider website associated with a digital content item), or networking system activities associated with the digital content item (e.g., likes, shares, comments). In one or more embodiments, the digital video insertion system 112 can utilize multiple conversion rates based on differing types of user interactions.

As mentioned above, and as shown in FIG. 3, the digital video insertion system 112 includes the organic value manager 306. In one or more embodiments, the organic value manager 306 determines an organic value that reflects a sentiment-based value of a particular digital content item to networking system users. As mentioned above, in one or more embodiments, the digital video insertion system 112 determines organic value based on positive user interactions and/or negative user interactions with a digital content item. For example, in one or more embodiments, the organic value manager 306 determines the organic value of digital content by finding the difference between the estimated click through rate (eCTR) associated with the digital content and the estimated negative feedback rate (eNFBR) associated with the digital content.

To illustrate, if the eCTR associated with the digital content is high and the eNFBR is low, the organic value manager 306 determines a high organic value for digital content; meaning networking system users associate a high level of sentiment with the digital content. Conversely, if the eCTR associated with the digital content is low, and the eNFBR is high, the organic value manager 306 determines a low organic value for the digital content; meaning networking system users associate a low level of sentiment with the digital content. In one or more embodiments, if the digital video insertion system 112 often inserts digital content associated with a low organic value into digital videos, it is possible that both the digital content provider associated with the digital content and the networking system 110 will lose good will and/or retention of one or more networking system users.

As mentioned above, in one or more embodiments, the digital video insertion system 112 tracks conversions corresponding to view-through completion, rather than a click-through action. In other words, when a digital content provider configures campaign parameters associated with a digital content item that the digital content provider hopes to have inserted into a digital video, the digital content provider can elect to emphasize conversions where the user watches the entire digital content item (rather than emphasizing clicks or selections).

Accordingly, in one or more embodiments, when determining the organic value associated with digital content, the organic value manager 306 may disregard eCTR and base the organic value of the digital content on the eNFBR. In other embodiments, rather than utilizing eCTR, the digital video insertion system 112 determines and utilizes a different value. For example, in one or more embodiments, the digital video insertion system 112 utilizes an expected completion rate. In one or more embodiments, the completion manager 308 determines the expected completion rate, as further discussed below.

In at least one embodiment, the digital video insertion system 112 utilizes feedback regarding whether a networking system user stops watching a digital video where the digital content item has been inserted (e.g., this can be referred to as an "XOut"). In one or more embodiments, the organic value manager 306 can determine the eNFBR associated with a digital content item by analyzing historical XOut data. Alternatively, the organic value manager 306 can determine the eNFBR based on historical XOut data in addition to other types of networking system activities (e.g., negative comments, offensive content reports, dislikes). Additionally or alternatively, the organic value manager 306 can determine eNFBR associated with a digital content item by utilizing a machine learning model that analyzes networking system information associated with a particular user and conversion information associated with the digital content item to determine a likelihood that the user will exit playback of the digital video in response to the digital content item being inserted in the digital video.

In at least one embodiment, the organic value manager 306 further determines the organic value of a digital content item based on an organic bid associated with the digital content item. As mentioned above, in one or more embodiments, the digital video insertion system 112 (via the online automated auction system 106) utilizes an organic bid in addition to a raw bid at the online auction to generate a total bid. In this manner, the digital video insertion system 112 can consider fit or improved sentiment of the user of the client-computing device 114 in identifying the winning bid. Thus, the digital content system 102 can provide organic bid information from the online auction to the organic value manager 306 (e.g., an organic bid that indicates fit or predicted improvement in sentiment in relation to the digital content item and the user of the client-computing device 114). In one or more embodiments, the organic value manager 306 can utilize the organic bid as the organic value. Similarly, in one or more embodiments, the organic value manager 306 can utilize the organic bid in addition to the methods/processes described above for generating an organic value.

As mentioned above, and as illustrated in FIG. 3, the digital video insertion system 112 includes the completion manager 308. In one or more embodiments, the completion manager 308 determines the estimated conversion rate (e.g., "eCVR" also referred to as estimated completion rate) associated with inserting a particular digital content item in a particular digital video. In one or more embodiments, the eCVR represents the likelihood that a networking system user will perform the actions that define a conversion relative to a particular digital content item. As discussed above, in the context associated with the digital video insertion system 112, a conversion can be defined by a networking system user watching the entirety of a digital content item that has been inserted into a digital video (e.g., a completion). Alternatively, in at least one embodiment, the estimated conversion or completion rate can represent the likelihood that a networking system user will view a threshold portion of a digital content item (e.g., 10 seconds). In other embodiments, the estimated conversion can represent the likelihood that a networking system user will engage in other types of networking system activities relative to the digital content item (e.g., click on a banner associated with the digital content item, visit a website associated with the digital content item).

In one or more embodiments, the completion manager 308 determines the eCVR associated with a digital content item by utilizing a machine learning model to determine the likelihood that a networking system user will watch the entirety of a digital content item that has been inserted into a video. In at least one embodiment, the machine learning model makes this determination based on networking system information associated with the user, networking system information associated with the digital video, and historical completion information associated with the digital content item. Additional details related to machine learning models are discussed below with regard to the machine learning manager 311.

As further mentioned above, and as illustrated in FIG. 3, the digital video insertion system 112 includes a watch time manager 310. In one or more embodiments, the watch time manager 310 estimates the value of the watch time associated with a digital video that will be lost when a particular digital content item inserted in the digital video fails to convert. As discussed above, in one or more embodiments, a digital content item inserted in a digital video fails to result in a conversion when the networking system user stops watching the digital content item before the digital content item is finished playing. When a user stops watching a digital content item, it follows that the networking system user also fails to watch the remaining portion of the digital video. Accordingly a conversion failure is an undesirable outcome not only for the digital content provider, but also for the digital video provider.

In one or more embodiments, the watch time manager 310 estimates the amount of watch time associated with a digital video that will be lost when a particular digital content item inserted in the digital video fails to result in conversion (e.g., when a user does not watch the digital content item). For example, in one or more embodiments, the watch time manager 310 utilizes a machine learning model to analyze historical post-digital-content watch time information associated with that particular digital content item. For example, the machine learning model can analyze historical data that includes post-digital-content watch time information associated with every digital video into which the digital content item has been inserted. After determining the amount of time that will be lost from a failed conversion, the watch time manager 310 can multiply this amount of time by the conversion rate determined by the completion manager 308, and then convert that value to a dollar amount using a normalizing factor. From this analysis, the watch time manager 310 determines the value of the watch time that will be lost if the digital content item fails to convert when inserted into a particular digital video.

In at least one embodiment, a digital content item may be associated with a new campaign. In such embodiments, there may not be sufficient historical data to determine a watch time loss. Thus, in one or more embodiments, the watch time manager 310 can use a constant scalar to represent the watch time loss associated with the digital content item when inserted into a particular digital video. The watch time manager 310 can determine the constant scalar based on other similar digital content items and other similar digital videos.

As mentioned above, and as shown in FIG. 3, the digital video insertion system 112 includes the machine learning manager 311. In one or more embodiments, the machine learning manager 311 creates machine learning models associated with various components of the digital video insertion system 112, identifies and/or generates ground truths and training data associated with each machine learning model, and trains each machine learning model to provide various outputs. Thus, in one or more embodiments, the machine learning manager 311 interacts with the organic value manager 306, the completion manager 308, and the watch time manager 310.

As used herein, the term "machine-learning model" refers to a computer representation that can be tuned (e.g., trained) based on inputs to approximate unknown functions. In particular, the term "machine-learning model" can include a model that utilizes algorithms to learn from, and make predictions on, known data by analyzing the known data to learn to generate outputs that reflect patterns and attributes of the known data. For instance, a machine-learning model can include a neural network, such as a convolutional neural network. A machine learning model can also include decision trees, support vector machines, linear regression, logistic regression, Bayesian networks, random forest learning, dimensionality reduction algorithms, boosting algorithms, deep learning neural networks, etc. Thus, a machine-learning model makes high-level abstractions in data by generating data-driven predictions or decisions from the known input data.

For example, the machine learning manager 311 interacts with the organic value manager 306 to provide a trained machine learning model that determines the predicted organic value of a digital content item relative to the user of the client-computing device 114. In one or more embodiments, the machine learning manager 311 trains a machine learning model to make this prediction utilizing training data such as characteristics of a user, characteristics of a digital content item, and/or characteristics of a digital video/insertion point. The machine learning manager 311 can provide this training information to a machine learning model and the machine learning model can predict an organic value (e.g., a rate at which networking system users will stop watching digital content). The machine learning manager 311 can train the machine learning model by comparing the predicted organic value with a ground truth organic value (e.g., ground truths observed and/or historical data). For instance, the machine learning manager 311 can apply a loss function that measures the difference between the predicted organic value and the ground truth organic value. The machine learning manager 311 can then tune parameters of the machine learning model to minimize the loss function.

Upon training the machine learning model, the machine learning manager 311 can then apply the machine learning model. For example, in response to the organic value manager 306 requesting a prediction specific to a predicted organic value relative to a particular digital content item, the machine learning manager 311 can generate a machine learning model input vector including information associated with the particular digital content item (e.g., characteristics of the digital content item, charcteristics of a user of the client-computing device 114, and/or characteristics of the digital video/insertion point). In response to providing this input vector to the machine learning model, the machine learning manager 311 can receive a prediction as to the predicted organic value of the digital content item relative to the user of the client-computing device 114.

Additionally, the machine learning manager 311 interacts with the completion manager 308 to provide a trained machine learning model that determines the expected completion rate associated with a digital content item. In one or more embodiments, the machine learning manager 311 trains a machine learning model to make this prediction utilizing training data regarding characteristics of digital content items, characteristics of users, and/or characteristics of digital videos/insertion points together with ground truth data such as historical completion rates for digital content inserted into digital videos available via the networking system 110. As discussed above, the machine learning manager 311 can analyze the training data with a machine learning model, generate predicted completion rates, and train the machine learning model by comparing the predicted completion rates with the ground truth completion rates.

Furthermore, in response to receiving a request for an expected completion rate from the completion manager 308, the machine learning manager 311 generates an input vector for the machine learning model (e.g., characteristics of a digital content item, characteristics of a user, and/or characteristics of a digital video/insertion point). For instance, the machine learning manager 311 can generate an input vector that includes networking system information associated with the user of the client-computing device 114 indicating a rate at which the user completes digital content inserted into digital videos, completion information associated with other networking system users who have been provided with the digital content, and completion information associated with digital content inserted in the digital video. In response to providing this input vector to the machine learning model, the machine learning manager 311 can generate (via the trained machine learning model) an estimated completion rate for providing the digital content to the user of the client-computing device 114.

Furthermore, the machine learning manager 311 interacts with the watch time manager 310 to provide a trained machine learning model that determines the predicted watch time loss associated with inserting a particular digital content item at an insertion point in a particular digital video. As described above, in one or more embodiments, the machine learning manager 311 trains a machine learning model to make this prediction utilizing training data (e.g., characteristics of digital content, users, and/or digital videos) and ground truth watch time loss (e.g., observed amounts of watch time lost due to the insertion of digital content into digital videos).

In response to receiving a request for a predicted watch time loss from the watch time manager 310, the machine learning manager 311 generates an input vector for the machine learning model. For example, the input vector can include information about the digital video (e.g., the length of the digital video, the position of the insertion point), networking system information associated with the user of the client-computing device 114 indicating the amount of time the user spends watching digital videos before and after digital content insertions, and whether there are additional insertion points in the digital video. In response to providing this input vector to the machine learning model, the machine learning manager 311 can utilize the trained machine learning model to generate a predicted watch time loss associated with providing the digital content at an insertion point in the digital video provided via the networking system application 118 on the client-computing device 114.

As mentioned above, and as shown in FIG. 3, the digital video insertion system 112 includes the insertion manager 312. In one or more embodiments, the insertion manager 312 configures insertion points in a digital video, and makes the determination whether to insert digital content at a particular insertion point. For example, the insertion manager 312 configures insertion points in a digital video in response to a notification from the activity manager 302 that the user of the client-computing device 114 has selected a digital video to play via the networking system application 118. Alternatively, the insertion manager 312 can configure insertion points in a digital video when the networking system application 118 downloads the digital video to the client-computing device 114, when the digital video provider uploads the digital video to the digital video insertion system 112, or when the networking system application 118 loads the digital video into the digital video playback GUI 208, as shown in FIG. 2B.

In response to the user selecting a digital video for playback, the insertion manager 312 configures one or more insertion points in the digital video by determining the length of the digital video and then positioning the one or more insertion points based on various heuristics. For instance, the insertion manager 312 can position the one or more insertion points at timestamps in the digital video associated with predetermined watched percentages (e.g., the timestamp that is 25% into the digital video, 50% into the digital video, 75% into the digital video). Alternatively, the insertion manager 312 can position the one or more insertion points at predetermined timestamps (e.g., two minutes into the digital video, four minutes into the digital video), until the insertion manager 312 runs out of digital video into which to position an insertion point. Additionally or alternatively, the insertion manager 312 can position the one or more insertion points based on contents of the digital video (e.g., an analysis of the contents of the digital video that indicates scene breaks, transition points, or dialog breaks). Furthermore, the insertion manager 312 can position the one or more insertion points based on user input from the digital video provider. As mentioned above, the insertion manager 312 positions an insertion point by earmarking a point in between two timestamps within the image frames of the digital video where digital content can be inserted.

In addition to configuring insertion points, the insertion manager 312 also determines whether to insert digital content at an approaching insertion point. As mentioned above, the activity manager 302 receives constantly updated playback information from the networking system application 118 detailing the playback position of an actively playing digital video. When the current playback position of an actively playing digital video is within a threshold amount of time from an insertion point (e.g., ten seconds), the digital video insertion system 112 queries digital content from the digital content system 102 and the insertion manager 312 determines whether to insert the queried digital content at the approaching insertion point in the digital video.

In one or more embodiments, the insertion manager 312 determines to insert the queried digital content at the approaching insertion point if the predicted total value of the digital content is greater than or equal to the predicted engagement loss associated with providing the digital content at the approaching insertion point in the digital video. This determination can be represented by the equation:

Predicted Total Value≥Predicted Engagement Loss

If the insertion manager 312 determines this equation is true, the insertion manager 312 either inserts the digital content at the insertion point (e.g., if the digital video is streaming from the networking system 110), or provides the digital content along with instructions to the networking system application 118 to insert the digital content at the insertion point.

In one or more embodiments, the insertion manager 312 makes the determination of whether to insertion digital content at an insertion point based on the values determined by the revenue value manager 304, the organic value manager 306, the completion manager 308, and the watch time manager 310. For example, in one or more embodiments, the Predicted Total Value of digital content is represented by the sum of the predicted revenue value associated with the digital content and the organic value associated with the digital content. In other words, the Predicted Total Value can be represented by:

Predicted Total Value=Predicted Revenue Value+ Predicted Organic Value

As discussed above, the revenue value manager 304 can determine the Predicted Revenue Value as (eCVR*raw bid). Similarly, as discussed above, the organic value manager 306 can determine the Predicted Organic Value as (eCTR−eNFBR). Thus, the Predicted Total Value of a digital content item can be represented by:

Predicted Total Value=(eCVR*raw bid)+(eCTR−eNFBR)

Where eCVR=estimated conversion rate associated with the digital content item, eCTR=estimated click-through rate associated with the digital content item, and eNFBR=estimated negative feedback rate associated with the digital content item.

Additionally, in one or more embodiments, the Predicted Engagement Loss associated with providing the digital content at the approaching insertion point in the digital video can be represented by the following equation:

Predicted Engagement Loss=(1−eCVR)*Watch Time Loss

Thus, in at least one embodiment, the insertion manager 312 determines to insert digital content at an approaching insertion point in an actively playing digital video by determining whether the following equation is true:

((eCVR*Raw Bid)+(eCTR−eNFBR))≥((1−eCVR)* Watch Time Loss)

In one or more embodiments, the insertion manager 312 multiplies each component in this equation by a normalizing factor (e.g., the User Dollar Amount) that converts each component to a dollar value for direct comparison. Additionally, in at least one embodiment, the insertion manager 312 can assign weighted values to one or more components of the equation above (e.g., the Predicted Revenue Value, Predicted Organic Value, eCTR, eNFBR, Watch Time Loss) in order to give additional importance to one or more components of the resulting determination. The insertion manager 312 can assign weighted values based on user input, or can assign weighted values automatically in order to achieve one or more insertion goals.

Furthermore, as mentioned above, in some embodiments, a digital video may include more than one insertion point. In those embodiments, the insertion manager 312 makes the same determination (e.g., comparing predicted total value to predicted engagement loss) based on updated values from the revenue value manager 304, the organic value manager 306, the completion manager 308, and the watch time manager 310 for each insertion point.

As shown in FIG. 3, and as mentioned above, the digital video insertion system 112 also includes the data storage 314 including digital content data 316. In one or more embodiments, the digital content data 316 is representative of digital content information, such as described herein.

Figure 4:
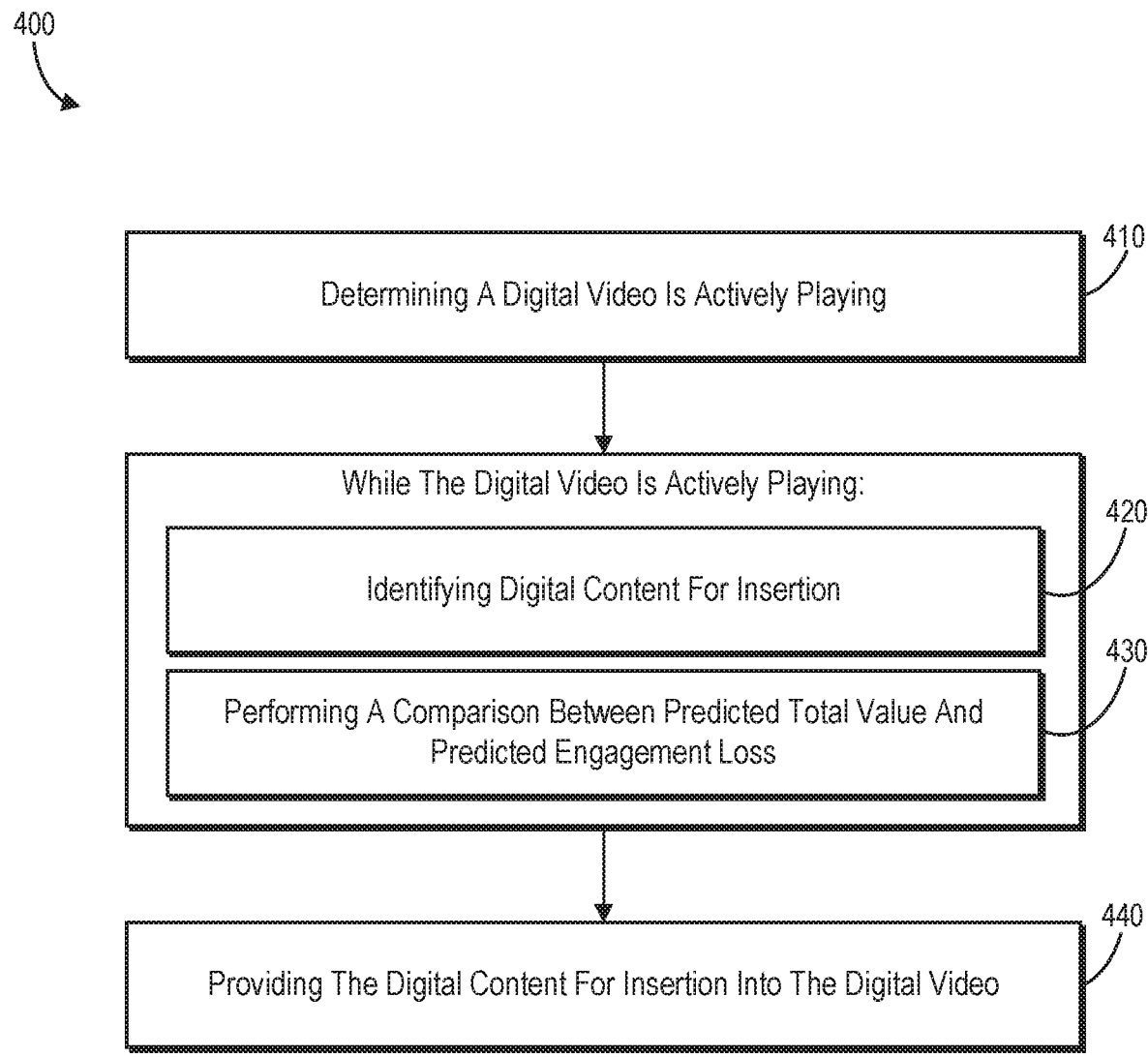
FIG. 4 illustrates a flowchart of a series of acts in a method of inserting digital content in a digital video in accordance with one or more embodiments.

Turning now to FIG. 4, this figure illustrates a flowchart of a series of acts 400 of providing digital content for insertion into a digital video. While FIG. 4 illustrates acts according to one embodiment, alternative embodiments may omit, add to, reorder, and/or modify any of the acts shown in FIG. 4. The acts of FIG. 4 can be performed as part of a method. Alternatively, a non-transitory computer readable-medium can comprise instructions, that when executed by one or more processor, cause a computing device to perform the acts of FIG. 4. In still further embodiments, a system can perform the acts of FIG. 4.

As shown in FIG. 4, the series of acts 400 includes an act 410 of determining a digital video is actively playing. For example, the act 410 can involve determining that a client-computing device is actively playing a digital video, wherein the digital video comprises an insertion point. For instance, in one or more embodiments, determining that the client-computing device is actively playing the digital video is in response to receiving playback information from the client-computing device. Alternatively, the act 410 can involve determining that a client-computing device is providing a digital video for display, wherein the digital video comprises an insertion point. In at least one embodiment, the series of acts 400 includes an act of, generating the insertion point in the digital video at a point beyond a predetermined percentage of image frames in the digital video.

Additionally, the series of acts 400 includes an act 420 of, while the digital video is actively playing, identifying digital content for insertion. For example, the act 420 can involve, while the client-computing device is actively playing or providing a portion of the digital video before the insertion point, identifying digital content for the insertion point of the digital video. In one or more embodiments, identifying digital content for insertion point of the digital video comprises receiving the digital content in response to sending a query including networking system information associated with a user of the client-computing device.

The series of acts 400 further includes an act 430 of, while the digital video is actively playing, performing a comparison between predicted total value and predicted engagement loss. For example, the act 430 can involve, while the client-computing device is actively playing or providing a portion of the digital video before the insertion point, performing a comparison between a predicted total value of the digital content and a predicted engagement loss associated with providing the digital content at the insertion point within the digital video.

In one or more embodiments, the series of acts 400 includes an act of determining the predicted total value of the digital content by: generating a predicted revenue value associated with the digital content; generating a predicted organic value associated with the digital content, wherein the predicted organic value comprises a measure of improved sentiment to a user of the client-computing device actively playing the digital video resulting from inserting the digital content; and determining the predicted total value of the digital content based on the predicted revenue value associated with the digital content and the predicted organic value associated with the digital content. In one or more embodiments, generating a predicted revenue value associated with the digital content includes: identifying a raw bid associated with the digital content; determining an expected completion rate associated with the digital content; and generating the predicted revenue value based on the identified raw bid associated with the digital content and the determined expected completion rate associated with the digital content. Additionally, in one or more embodiments, generating the predicted organic value associated with the digital content comprises determining a likelihood that a user of the client-computing device will exit playback of the digital content prior to completion of the digital content by analyzing one or more of: historical data associated with the digital content, or a fit between the user of the client-computing device and the digital content.

Additionally, in one or more embodiments, the series of acts 400 includes an act of determining the predicted engagement loss associated with providing the digital content at the insertion point within the digital video by: identifying an estimated digital content completion rate; identifying a predicted watch time loss associated with providing the digital content for display at the insertion point of the digital video; and determining the predicted engagement loss based on the predicted digital content completion rate completion rate and the predicted watch time loss associated with providing the digital content for display at the insertion point of the digital video.

The series of acts 400 also includes an act 440 of providing the digital content for insertion into the digital video. For example, the act 440 can involve, based on the comparison, providing for display to the client-computing device the digital content at the insertion point of the digital video. In one or more embodiments, providing for display to the client-computing device the digital content at the insertion point further includes: determining, based on the comparison, that the predicted total value of the digital content is greater than the predicted engagement loss associated with providing the digital content at the insertion point within the digital video; and in response to determining that the predicted total value of the digital content is greater than the predicted engagement loss associated with providing the digital content at the insertion point within the digital video, providing for display to the client-computing device, the digital content at the insertion point of the digital video.

In one or more embodiments, the series of acts 400 also includes acts of identifying a second insertion point of the digital video; identifying a digital content item for the second insertion point of the digital video; performing an additional comparison between a predicted total value of the digital content item and a predicted engagement loss associated with providing the digital content item at the second insertion point within the digital video; and based on the additional comparison, withholding the digital content item such that the digital content item is not provided for display to the client-computing device at the second insertion point of the digital video. For example, in at least one embodiment, withholding the digital content item is in response to the additional comparison indicating that the predicted total value of the digital content item is less than the predicted engagement loss associated with providing the digital content item at the second insertion point within the digital video.

In one or more embodiments, the series of acts 400 also includes the act of, in response to providing the digital content at the insertion point of the digital video, receiving playback information from the client-computing device. For example, in at least one embodiment, the series of acts 400 includes utilizing the received playback information to train one or more machine learning models to generate at least one of: one or more digital content completion rates or one or more watch time losses.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 5:
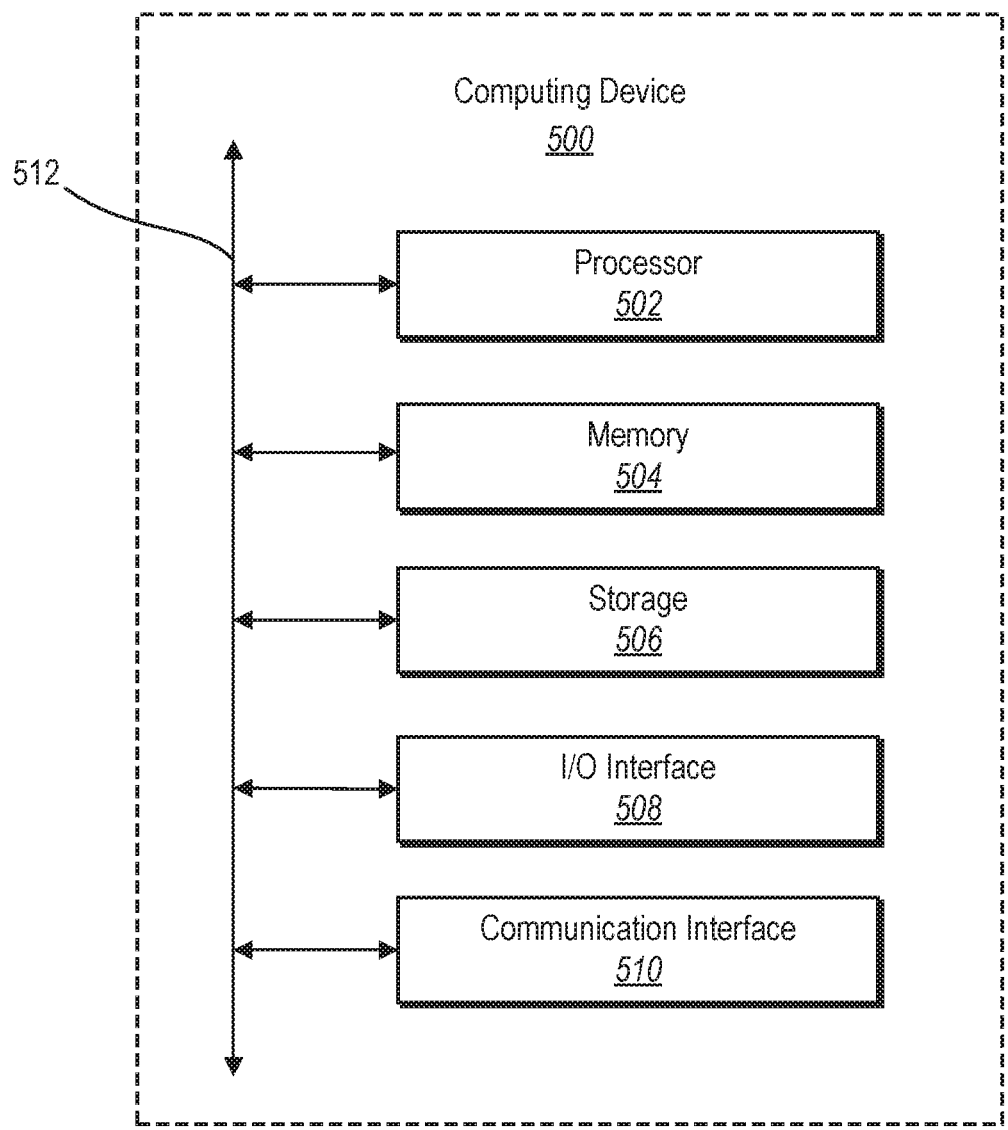
FIG. 5 illustrates a block diagram of an exemplary computing device in accordance with one or more embodiments.

FIG. 5 illustrates a block diagram of exemplary computing device 500 that may be configured to perform one or more of the processes described above. One will appreciate that one or more computing devices such as the computing device 500 may implement one or more components the digital video insertion system 112. As shown by FIG. 5, the computing device 500 can comprise a processor 502, a memory 504, a storage device 506, an I/O interface 508, and a communication interface 510, which may be communicatively coupled by way of a communication infrastructure 512. While an exemplary computing device 500 is shown in FIG. 5, the components illustrated in FIG. 5 are not intended to be limiting. Additional or alternative components may be used in other embodiments. Furthermore, in certain embodiments, the computing device 500 can include fewer components than those shown in FIG. 5. Components of the computing device 500 shown in FIG. 5 will now be described in additional detail.

In one or more embodiments, the processor 502 includes hardware for executing instructions, such as those making up a computer program. As an example and not by way of limitation, to execute instructions, the processor 502 may retrieve (or fetch) the instructions from an internal register, an internal cache, the memory 504, or the storage device 506 and decode and execute them. In one or more embodiments, the processor 502 may include one or more internal caches for data, instructions, or addresses. As an example and not by way of limitation, the processor 502 may include one or more instruction caches, one or more data caches, and one or more translation lookaside buffers (TLBs). Instructions in the instruction caches may be copies of instructions in the memory 504 or the storage device 506.

The memory 504 may be used for storing data, metadata, and programs for execution by the processor(s). The memory 504 may include one or more of volatile and non-volatile memories, such as Random Access Memory ("RAM"), Read Only Memory ("ROM"), a solid-state disk ("SSD"), Flash, Phase Change Memory ("PCM"), or other types of data storage. The memory 504 may be internal or distributed memory.

The storage device 506 includes storage for storing data or instructions. As an example and not by way of limitation, storage device 506 can comprise a non-transitory storage medium described above. The storage device 506 may include a hard disk drive (HDD), a floppy disk drive, flash memory, an optical disc, a magneto-optical disc, magnetic tape, or a Universal Serial Bus (USB) drive or a combination of two or more of these. The storage device 506 may include removable or non-removable (or fixed) media, where appropriate. The storage device 506 may be internal or external to the computing device 500. In one or more embodiments, the storage device 506 is non-volatile, solid-state memory. In other embodiments, the storage device 506 includes read-only memory (ROM). Where appropriate, this ROM may be mask programmed ROM, programmable ROM (PROM), erasable PROM (EPROM), electrically erasable PROM (EEPROM), electrically alterable ROM (EAROM), or flash memory or a combination of two or more of these.

The I/O interface 508 allows a user to provide input to, receive output from, and otherwise transfer data to and receive data from computing device 500. The I/O interface 508 may include a mouse, a keypad or a keyboard, a touch screen, a camera, an optical scanner, network interface, modem, other known I/O devices or a combination of such I/O interfaces. The I/O interface 508 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 508 is configured to provide graphical data to a display for presentation to a user. The graphical data may be representative of one or more graphical user interfaces and/or any other graphical content as may serve a particular implementation.

The communication interface 510 can include hardware, software, or both. In any event, the communication interface 510 can provide one or more interfaces for communication (such as, for example, packet-based communication) between the computing device 500 and one or more other computing devices or networks. As an example and not by way of limitation, the communication interface 510 may include a network interface controller (NIC) or network adapter for communicating with an Ethernet or other wire-based network or a wireless NIC (WNIC) or wireless adapter for communicating with a wireless network, such as a WI-FI.

Additionally or alternatively, the communication interface 510 may facilitate communications with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, the communication interface 510 may facilitate communications with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination thereof.

Additionally, the communication interface 510 may facilitate communications various communication protocols. Examples of communication protocols that may be used include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), radio frequency ("RF") signaling technologies, Long Term Evolution ("LTE") technologies, wireless communication technologies, in-band and out-of-band signaling technologies, and other suitable communications networks and technologies.

The communication infrastructure 512 may include hardware, software, or both that couples components of the computing device 500 to each other. As an example and not by way of limitation, the communication infrastructure 512 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination thereof.

As mentioned above, in one or more embodiments, the digital video insertion system 112 operates in connection with a social networking system (e.g., the networking system 110 as described with reference to FIG. 1). In addition to the description given above, a social networking system may enable its users (such as persons or organizations) to interact with the system and with each other. The social networking system may, with input from a user, create and store in the social networking system a user profile associated with the user. The user profile may include demographic information, communication-channel information, and information on personal interests of the user. The social networking system may also, with input from a user, create and store a record of relationships of the user with other users of the social networking system, as well as provide services (e.g., posts, photo-sharing, event organization, messaging, games, or advertisements) to facilitate social interaction between or among users.

The social networking system may store records of users and relationships between users in a social graph comprising a plurality of nodes and a plurality of edges connecting the nodes. The nodes may comprise a plurality of user nodes and a plurality of concept nodes. A user node of the social graph may correspond to a user of the social networking system. A user may be an individual (human user), an entity (e.g., an enterprise, business, or third party application), or a group (e.g., of individuals or entities). A user node corresponding to a user may comprise information provided by the user and information gathered by various systems, including the social networking system.

For example, the user may provide his or her name, profile picture, city of residence, contact information, birth date, gender, marital status, family status, employment, educational background, preferences, interests, and other demographic information to be included in the user node. Each user node of the social graph may have a corresponding web page (typically known as a profile page). In response to a request including a user name, the social networking system can access a user node corresponding to the user name, and construct a profile page including the name, a profile picture, and other information associated with the user. A profile page of a first user may display to a second user all or a portion of the first user's information based on one or more privacy settings by the first user and the relationship between the first user and the second user.

A concept node may correspond to a concept of the social networking system. For example, a concept can represent a real-world entity, such as a movie, a song, a sports team, a celebrity, a group, a restaurant, or a place or a location. An administrative user of a concept node corresponding to a concept may create or update the concept node by providing information of the concept (e.g., by filling out an online form), causing the social networking system to associate the information with the concept node. For example and without limitation, information associated with a concept can include a name or a title, one or more images (e.g., an image of cover page of a book), a web site (e.g., an URL address) or contact information (e.g., a phone number, an email address). Each concept node of the social graph may correspond to a web page. For example, in response to a request including a name, the social networking system can access a concept node corresponding to the name, and construct a web page including the name and other information associated with the concept.

An edge between a pair of nodes may represent a relationship between the pair of nodes. For example, an edge between two user nodes can represent a friendship between two users. For another example, the social networking system may construct a web page (or a structured document) of a concept node (e.g., a restaurant, a celebrity), incorporating one or more selectable option or selectable elements (e.g., "like", "check in") in the web page. A user can access the page using a web browser hosted by the user's client device and select a selectable option or selectable element, causing the client device to transmit to the social networking system a request to create an edge between a user node of the user and a concept node of the concept, indicating a relationship between the user and the concept (e.g., the user checks in a restaurant, or the user "likes" a celebrity).

As an example, a user may provide (or change) his or her city of residence, causing the social networking system to create an edge between a user node corresponding to the user and a concept node corresponding to the city declared by the user as his or her city of residence. In addition, the degree of separation between any two nodes is defined as the minimum number of hops required to traverse the social graph from one node to the other. A degree of separation between two nodes can be considered a measure of relatedness between the users or the concepts represented by the two nodes in the social graph. For example, two users having user nodes that are directly connected by an edge (i.e., are first-degree nodes) may be described as "connected users" or "friends." Similarly, two users having user nodes that are connected only through another user node (i.e., are second-degree nodes) may be described as "friends of friends."

A social networking system may support a variety of applications, such as photo sharing, on-line calendars and events, gaming, instant messaging, and advertising. For example, the social networking system may also include media sharing capabilities. Also, the social networking system may allow users to post photographs and other multimedia content items to a user's profile page (typically known as "wall posts" or "timeline posts") or in a photo album, both of which may be accessible to other users of the social networking system depending upon the user's configured privacy settings. The social networking system may also allow users to configure events. For example, a first user may configure an event with attributes including time and date of the event, location of the event and other users invited to the event. The invited users may receive invitations to the event and respond (such as by accepting the invitation or declining it). Furthermore, the social networking system may allow users to maintain a personal calendar. Similarly to events, the calendar entries may include times, dates, locations and identities of other users.

Figure 6:
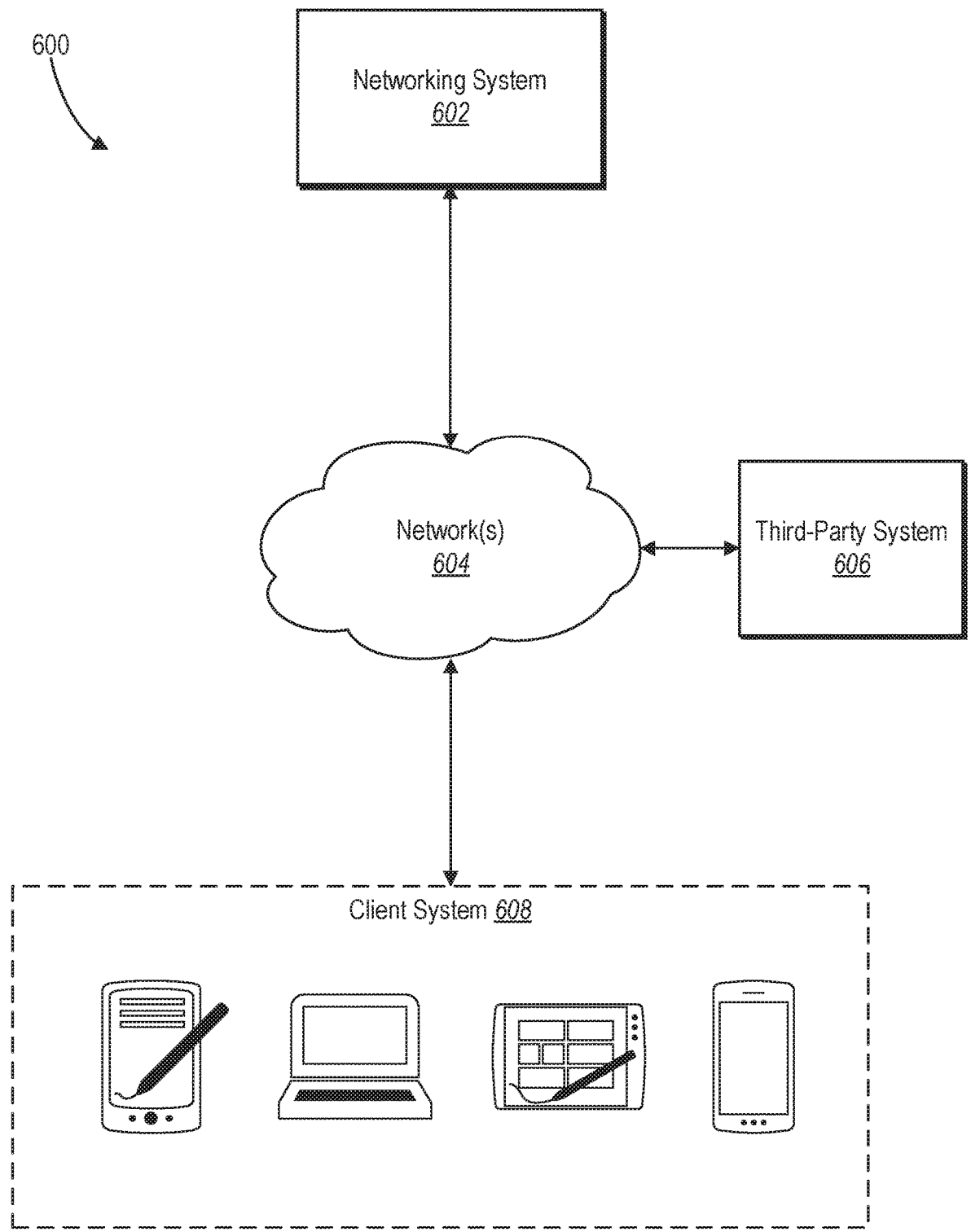
FIG. 6 is an example network environment of a networking system in accordance with one or more embodiments.

FIG. 6 illustrates an example network environment 600 of a social networking system. Network environment 600 includes a client device 606, a networking system 602 (e.g., a social networking system and/or an electronic messaging system), and a third-party system 608 connected to each other by a network 604. Although FIG. 6 illustrates a particular arrangement of client device 606, networking system 602, third-party system 608, and network 604, this disclosure contemplates any suitable arrangement of client device 606, networking system 602, third-party system 608, and network 604. As an example and not by way of limitation, two or more of client device 606, networking system 602, and third-party system 608 may be connected to each other directly, bypassing network 604. As another example, two or more of client device 606, networking system 602, and third-party system 608 may be physically or logically co-located with each other in whole or in part. Moreover, although FIG. 6 illustrates a particular number of client devices 606, networking systems 602, third-party systems 608, and networks 604, this disclosure contemplates any suitable number of client devices 606, networking systems 602, third-party systems 608, and networks 604. As an example and not by way of limitation, network environment 600 may include multiple client device 606, networking systems 602, third-party systems 608, and networks 604.

This disclosure contemplates any suitable network 604. As an example and not by way of limitation, one or more portions of network 604 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 604 may include one or more networks 604.

Links may connect client device 606, networking system 602, and third-party system 608 to communication network 604 or to each other. This disclosure contemplates any suitable links. In particular embodiments, one or more links include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link, or a combination of two or more such links. Links need not necessarily be the same throughout network environment 600. One or more first links may differ in one or more respects from one or more second links.

In particular embodiments, client device 606 may be an electronic device including hardware, software, or embedded logic components or a combination of two or more such components and capable of carrying out the appropriate functionalities implemented or supported by client device 606. As an example and not by way of limitation, a client device 606 may include a computer system such as an augmented reality display device, a desktop computer, notebook or laptop computer, netbook, a tablet computer, e-book reader, GPS device, camera, personal digital assistant (PDA), handheld electronic device, cellular telephone, smartphone, other suitable electronic device, or any suitable combination thereof. This disclosure contemplates any suitable client devices 606. A client device 606 may enable a network user at client device 606 to access network 604. A client device 606 may enable its user to communicate with other users at other client devices 606.

In particular embodiments, client device 606 may include a web browser, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client device 606 may enter a Uniform Resource Locator (URL) or other address directing the web browser to a particular server (such as server, or a server associated with a third-party system 608), and the web browser may generate a Hyper Text Transfer Protocol (HTTP) request and communicate the HTTP request to server. The server may accept the HTTP request and communicate to client device 606 one or more Hyper Text Markup Language (HTML) files responsive to the HTTP request. Client device 606 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, networking system 602 may be a network-addressable computing system that can host an online social network. Networking system 602 may generate, store, receive, and send social-networking data, such as, for example, user-profile data, concept-profile data, social-graph information, or other suitable data related to the online social network. Networking system 602 may be accessed by the other components of network environment 600 either directly or via network 604. In particular embodiments, networking system 602 may include one or more servers. Each server may be a unitary server or a distributed server spanning multiple computers or multiple datacenters. Servers may be of various types, such as, for example and without limitation, web server, news server, mail server, message server, advertising server, file server, application server, exchange server, database server, proxy server, another server suitable for performing functions or processes described herein, or any combination thereof. In particular embodiments, each server may include hardware, software, or embedded logic components or a combination of two or more such components for carrying out the appropriate functionalities implemented or supported by server. In particular embodiments, networking system 602 may include one or more data stores. Data stores may be used to store various types of information. In particular embodiments, the information stored in data stores may be organized according to specific data structures. In particular embodiments, each data store may be a relational, columnar, correlation, or other suitable database. Although this disclosure describes or illustrates particular types of databases, this disclosure contemplates any suitable types of databases. Particular embodiments may provide interfaces that enable a client device 606, a networking system 602, or a third-party system 608 to manage, retrieve, modify, add, or delete, the information stored in data store.

In particular embodiments, networking system 602 may store one or more social graphs in one or more data stores. In particular embodiments, a social graph may include multiple nodes—which may include multiple user nodes (each corresponding to a particular user) or multiple concept nodes (each corresponding to a particular concept)—and multiple edges connecting the nodes. Networking system 602 may provide users of the online social network the ability to communicate and interact with other users. In particular embodiments, users may join the online social network via networking system 602 and then add connections (e.g., relationships) to a number of other users of networking system 602 that they want to be connected to. Herein, the term "friend" may refer to any other user of networking system 602 with whom a user has formed a connection, association, or relationship via networking system 602.

In particular embodiments, networking system 602 may provide users with the ability to take actions on various types of items or objects, supported by networking system 602. As an example and not by way of limitation, the items and objects may include groups or social networks to which users of networking system 602 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in networking system 602 or by an external system of third-party system 608, which is separate from networking system 602 and coupled to networking system 602 via a network 604.

In particular embodiments, networking system 602 may be capable of linking a variety of entities. As an example and not by way of limitation, networking system 602 may enable users to interact with each other as well as receive content from third-party systems 608 or other entities, or to allow users to interact with these entities through an application programming interfaces (API) or other communication channels.

In particular embodiments, a third-party system 608 may include one or more types of servers, one or more data stores, one or more interfaces, including but not limited to APIs, one or more web services, one or more content sources, one or more networks, or any other suitable components, e.g., that servers may communicate with. A third-party system 608 may be operated by a different entity from an entity operating networking system 602. In particular embodiments, however, networking system 602 and third-party systems 608 may operate in conjunction with each other to provide social-networking services to users of networking system 602 or third-party systems 608. In this sense, networking system 602 may provide a platform, or backbone, which other systems, such as third-party systems 608, may use to provide social-networking services and functionality to users across the Internet.

In particular embodiments, a third-party system 608 may include a third-party content object provider. A third-party content object provider may include one or more sources of content objects, which may be communicated to a client device 606. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, networking system 602 also includes user-generated content objects, which may enhance a user's interactions with networking system 602. User-generated content may include anything a user can add, upload, send, or "post" to networking system 602. As an example and not by way of limitation, a user communicates posts to networking system 602 from a client device 606. Posts may include data such as status updates or other textual data, location information, photos, videos, links, music or other similar data or media. Content may also be added to networking system 602 by a third-party through a "communication channel," such as a newsfeed or stream.

In particular embodiments, networking system 602 may include a variety of servers, sub-systems, programs, modules, logs, and data stores. In particular embodiments, networking system 602 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Networking system 602 may also include suitable components such as network interfaces, security mechanisms, load balancers, failover servers, management-and-network-operations consoles, other suitable components, or any suitable combination thereof. In particular embodiments, networking system 602 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking networking system 602 to one or more client devices 606 or one or more third-party system 608 via network 604. The web server may include a mail server or other messaging functionality for receiving and routing messages between networking system 602 and one or more client devices 606. An API-request server may allow a third-party system 608 to access information from networking system 602 by calling one or more APIs. An action logger may be used to receive communications from a web server about a user's actions on or off networking system 602. In conjunction with the action log, a third-party-content-object log may be maintained of user exposures to third-party-content objects. A notification controller may provide information regarding content objects to a client device 606. Information may be pushed to a client device 606 as notifications, or information may be pulled from client device 606 responsive to a request received from client device 606. Authorization servers may be used to enforce one or more privacy settings of the users of networking system 602. A privacy setting of a user determines how particular information associated with a user can be shared. The authorization server may allow users to opt in to or opt out of having their actions logged by networking system 602 or shared with other systems (e.g., third-party system 608), such as, for example, by setting appropriate privacy settings. Third-party-content-object stores may be used to store content objects received from third parties, such as a third-party system 608. Location stores may be used for storing location information received from client devices 606 associated with users. Advertisement-pricing modules may combine social information, the current time, location information, or other suitable information to provide relevant advertisements, in the form of notifications, to a user.

Figure 7:
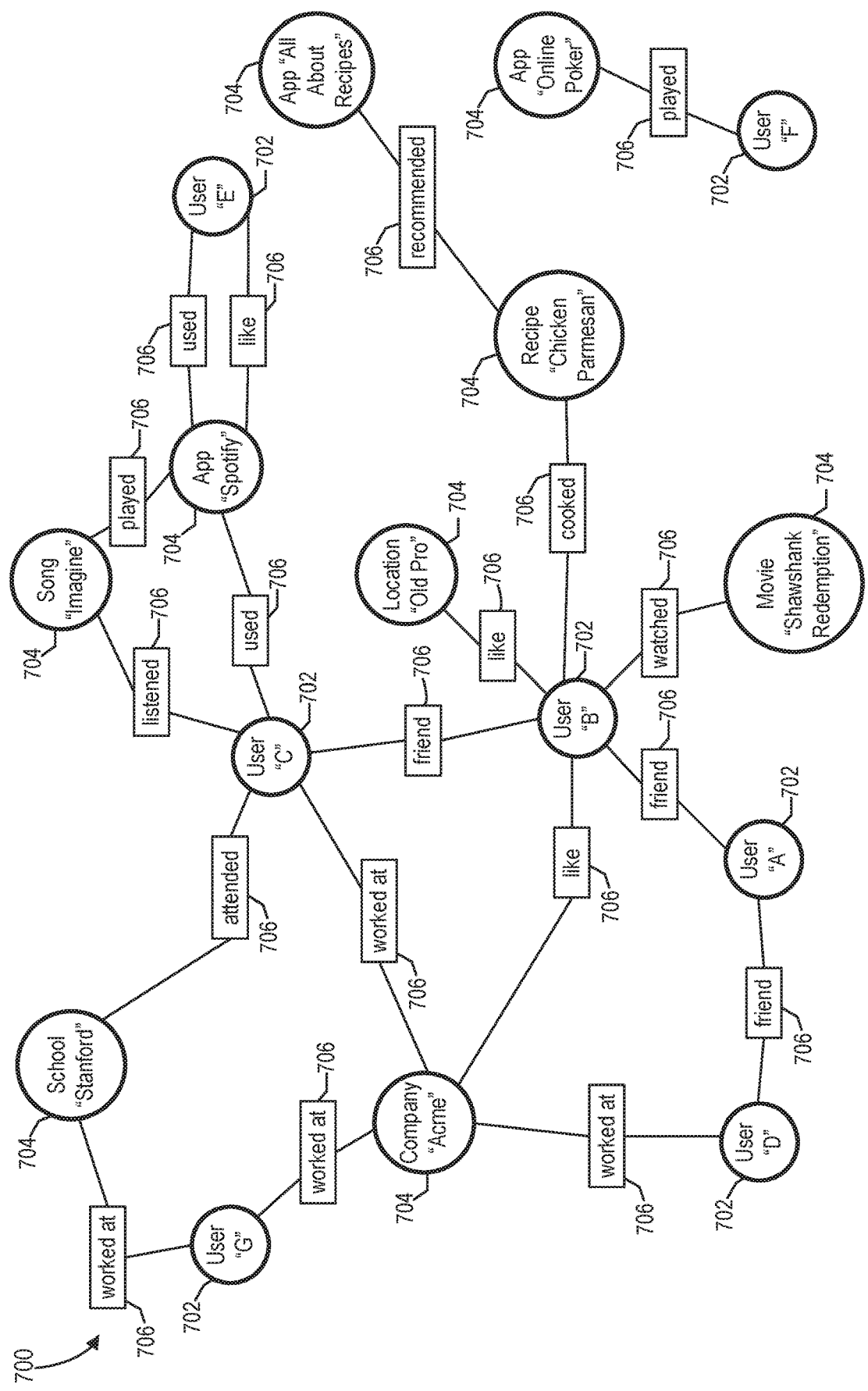
FIG. 7 illustrates a social graph in accordance with one or more embodiments.

FIG. 7 illustrates example social graph 700. In particular embodiments, networking system 602 may store one or more social graphs 700 in one or more data stores. In particular embodiments, social graph 700 may include multiple nodes—which may include multiple user nodes 702 or multiple concept nodes 704—and multiple edges 706 connecting the nodes. Example social graph 700 illustrated in FIG. 7 is shown, for didactic purposes, in a two-dimensional visual map representation. In particular embodiments, a networking system 602, client device 606, or third-party system 608 may access social graph 700 and related social-graph information for suitable applications. The nodes and edges of social graph 700 may be stored as data objects, for example, in a data store (such as a social-graph database). Such a data store may include one or more searchable or query able indexes of nodes or edges of social graph 700.

In particular embodiments, a user node 702 may correspond to a user of networking system 602. As an example and not by way of limitation, a user may be an individual (human user), an entity (e.g., an enterprise, business, or third-party application), or a group (e.g., of individuals or entities) that interacts or communicates with or over networking system 602. In particular embodiments, when a user registers for an account with networking system 602, networking system 602 may create a user node 702 corresponding to the user, and store the user node 702 in one or more data stores. Users and user nodes 702 described herein may, where appropriate, refer to registered users and user nodes 702 associated with registered users. In addition or as an alternative, users and user nodes 702 described herein may, where appropriate, refer to users that have not registered with networking system 602. In particular embodiments, a user node 702 may be associated with information provided by a user or information gathered by various systems, including networking system 602. As an example and not by way of limitation, a user may provide his or her name, profile picture, contact information, birth date, sex, marital status, family status, employment, education background, preferences, interests, or other demographic information. In particular embodiments, a user node 702 may be associated with one or more data objects corresponding to information associated with a user. In particular embodiments, a user node 702 may correspond to one or more webpages.

In particular embodiments, a concept node 704 may correspond to a concept. As an example and not by way of limitation, a concept may correspond to a place (such as, for example, a movie theater, restaurant, landmark, or city); a website (such as, for example, a website associated with networking system 602 or a third-party website associated with a web-application server); an entity (such as, for example, a person, business, group, sports team, or celebrity); a resource (such as, for example, an audio file, video file, digital photo, text file, structured document, or application) which may be located within networking system 602 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 704 may be associated with information of a concept provided by a user or information gathered by various systems, including networking system 602. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 704 may be associated with one or more data objects corresponding to information associated with concept node 704. In particular embodiments, a concept node 704 may correspond to one or more webpages.

In particular embodiments, a node in social graph 700 may represent or be represented by a webpage (which may be referred to as a "profile page"). Profile pages may be hosted by or accessible to networking system 602. Profile pages may also be hosted on third-party websites associated with a third-party system 608. As an example and not by way of limitation, a profile page corresponding to a particular external webpage may be the particular external webpage and the profile page may correspond to a particular concept node 704. Profile pages may be viewable by all or a selected subset of other users. As an example and not by way of limitation, a user node 702 may have a corresponding user-profile page in which the corresponding user may add content, make declarations, or otherwise express himself or herself. As another example and not by way of limitation, a concept node 704 may have a corresponding concept-profile page in which one or more users may add content, make declarations, or express themselves, particularly in relation to the concept corresponding to concept node 704.

In particular embodiments, a concept node 704 may represent a third-party webpage or resource hosted by a third-party system 608. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check in," "eat," "recommend," or another suitable action or activity. A user viewing the third-party webpage may perform an action by selecting one of the icons (e.g., "eat"), causing a client device 606 to send to networking system 602 a message indicating the user's action. In response to the message, networking system 602 may create an edge (e.g., an "eat" edge) between a user node 702 corresponding to the user and a concept node 704 corresponding to the third-party webpage or resource and store edge 706 in one or more data stores.

In particular embodiments, a pair of nodes in social graph 700 may be connected to each other by one or more edges 706. An edge 706 connecting a pair of nodes may represent a relationship between the pair of nodes. In particular embodiments, an edge 706 may include or represent one or more data objects or attributes corresponding to the relationship between a pair of nodes. As an example and not by way of limitation, a first user may indicate that a second user is a "friend" of the first user. In response to this indication, networking system 602 may send a "friend request" to the second user. If the second user confirms the "friend request," networking system 602 may create an edge 706 connecting the first user's user node 702 to the second user's user node 702 in social graph 700 and store edge 706 as social-graph information in one or more of data stores. In the example of FIG. 7, social graph 700 includes an edge 706 indicating a friend relation between user nodes 702 of user "A" and user "B" and an edge indicating a friend relation between user nodes 702 of user "C" and user "B." Although this disclosure describes or illustrates particular edges 706 with particular attributes connecting particular user nodes 702, this disclosure contemplates any suitable edges 706 with any suitable attributes connecting user nodes 702. As an example and not by way of limitation, an edge 706 may represent a friendship, family relationship, business or employment relationship, fan relationship, follower relationship, visitor relationship, sub scriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 700 by one or more edges 706.

In particular embodiments, an edge 706 between a user node 702 and a concept node 704 may represent a particular action or activity performed by a user associated with user node 702 toward a concept associated with a concept node 704. As an example and not by way of limitation, as illustrated in FIG. 7, a user may "like," "attended," "played," "listened," "cooked," "worked at," or "watched" a concept, each of which may correspond to an edge type or subtype. A concept-profile page corresponding to a concept node 704 may include, for example, a selectable "check in" icon (such as, for example, a clickable "check in" icon) or a selectable "add to favorites" icon. Similarly, after a user clicks these icons, networking system 602 may create a "favorite" edge or a "check in" edge in response to a user's action corresponding to a respective action. As another example and not by way of limitation, a user (user "C") may listen to a particular song ("Ramble On") using a particular application (SPOTIFY, which is an online music application). In this case, networking system 602 may create a "listened" edge 706 and a "used" edge (as illustrated in FIG. 7) between user nodes 702 corresponding to the user and concept nodes 704 corresponding to the song and application to indicate that the user listened to the song and used the application. Moreover, networking system 602 may create a "played" edge 706 (as illustrated in FIG. 7) between concept nodes 704 corresponding to the song and the application to indicate that the particular song was played by the particular application. In this case, "played" edge 706 corresponds to an action performed by an external application (SPOTIFY) on an external audio file (the song "Imagine"). Although this disclosure describes particular edges 706 with particular attributes connecting user nodes 702 and concept nodes 704, this disclosure contemplates any suitable edges 706 with any suitable attributes connecting user nodes 702 and concept nodes 704. Moreover, although this disclosure describes edges between a user node 702 and a concept node 704 representing a single relationship, this disclosure contemplates edges between a user node 702 and a concept node 704 representing one or more relationships. As an example and not by way of limitation, an edge 706 may represent both that a user likes and has used at a particular concept. Alternatively, another edge 706 may represent each type of relationship (or multiples of a single relationship) between a user node 702 and a concept node 704 (as illustrated in FIG. 7 between user node 702 for user "E" and concept node 704 for "SPOTIFY").

In particular embodiments, networking system 602 may create an edge 706 between a user node 702 and a concept node 704 in social graph 700. As an example and not by way of limitation, a user viewing a concept-profile page (such as, for example, by using a web browser or a special-purpose application hosted by the user's client device 606) may indicate that he or she likes the concept represented by the concept node 704 by clicking or selecting a "Like" icon, which may cause the user's client device 606 to send to networking system 602 a message indicating the user's liking of the concept associated with the concept-profile page. In response to the message, networking system 602 may create an edge 706 between user node 702 associated with the user and concept node 704, as illustrated by "like" edge 706 between the user and concept node 704. In particular embodiments, networking system 602 may store an edge 706 in one or more data stores. In particular embodiments, an edge 706 may be automatically formed by networking system 602 in response to a particular user action. As an example and not by way of limitation, if a first user uploads a picture, watches a movie, or listens to a song, an edge 706 may be formed between user node 702 corresponding to the first user and concept nodes 704 corresponding to those concepts. Although this disclosure describes forming particular edges 706 in particular manners, this disclosure contemplates forming any suitable edges 706 in any suitable manner.

In particular embodiments, an advertisement may be text (which may be HTML-linked), one or more images (which may be HTML-linked), one or more videos, audio, one or more ADOBE FLASH files, a suitable combination of these, or any other suitable advertisement in any suitable digital format presented on one or more webpages, in one or more e-mails, or in connection with search results requested by a user. In addition or as an alternative, an advertisement may be one or more sponsored stories (e.g., a news-feed or ticker item on networking system 602). A sponsored story may be a social action by a user (such as "liking" a page, "liking" or commenting on a post on a page, RSVPing to an event associated with a page, voting on a question posted on a page, checking in to a place, using an application or playing a game, or "liking" or sharing a website) that an advertiser promotes, for example, by having the social action presented within a pre-determined area of a profile page of a user or other page, presented with additional information associated with the advertiser, bumped up or otherwise highlighted within news feeds or tickers of other users, or otherwise promoted. The advertiser may pay to have the social action promoted. As an example and not by way of limitation, advertisements may be included among the search results of a search-results page, where sponsored content is promoted over non-sponsored content.

In particular embodiments, an advertisement may be requested for display within social-networking-system webpages, third-party webpages, or other pages. An advertisement may be displayed in a dedicated portion of a page, such as in a banner area at the top of the page, in a column at the side of the page, in a GUI of the page, in a pop-up window, in a drop-down menu, in an input field of the page, over the top of content of the page, or elsewhere with respect to the page. In addition or as an alternative, an advertisement may be displayed within an application. An advertisement may be displayed within dedicated pages, requiring the user to interact with or watch the advertisement before the user may access a page or utilize an application. The user may, for example view the advertisement through a web browser.

A user may interact with an advertisement in any suitable manner. The user may click or otherwise select the advertisement. By selecting the advertisement, the user may be directed to (or a browser or other application being used by the user) a page associated with the advertisement. At the page associated with the advertisement, the user may take additional actions, such as purchasing a product or service associated with the advertisement, receiving information associated with the advertisement, or subscribing to a newsletter associated with the advertisement. An advertisement with audio or video may be played by selecting a component of the advertisement (like a "play button"). Alternatively, by selecting the advertisement, networking system 602 may execute or modify a particular action of the user.

An advertisement may also include social-networking-system functionality that a user may interact with. As an example and not by way of limitation, an advertisement may enable a user to "like" or otherwise endorse the advertisement by selecting an icon or link associated with endorsement. As another example and not by way of limitation, an advertisement may enable a user to search (e.g., by executing a query) for content related to the advertiser. Similarly, a user may share the advertisement with another user (e.g., through networking system 602) or RSVP (e.g., through networking system 602) to an event associated with the advertisement. In addition or as an alternative, an advertisement may include social-networking-system context directed to the user. As an example and not by way of limitation, an advertisement may display information about a friend of the user within networking system 602 who has taken an action associated with the subject matter of the advertisement.

In particular embodiments, networking system 602 may determine the social-graph affinity (which may be referred to herein as "affinity") of various social-graph entities for each other. Affinity may represent the strength of a relationship or level of interest between particular objects associated with the online social network, such as users, concepts, content, actions, advertisements, other objects associated with the online social network, or any suitable combination thereof. Affinity may also be determined with respect to objects associated with third-party systems 608 or other suitable systems. An overall affinity for a social-graph entity for each user, subject matter, or type of content may be established. The overall affinity may change based on continued monitoring of the actions or relationships associated with the social-graph entity. Although this disclosure describes determining particular affinities in a particular manner, this disclosure contemplates determining any suitable affinities in any suitable manner.

In particular embodiments, networking system 602 may measure or quantify social-graph affinity using an affinity coefficient (which may be referred to herein as "coefficient"). The coefficient may represent or quantify the strength of a relationship between particular objects associated with the online social network. The coefficient may also represent a probability or function that measures a predicted probability that a user will perform a particular action based on the user's interest in the action. In this way, a user's future actions may be predicted based on the user's prior actions, where the coefficient may be calculated at least in part based on the history of the user's actions. Coefficients may be used to predict any number of actions, which may be within or outside of the online social network. As an example and not by way of limitation, these actions may include various types of communications, such as sending messages, posting content, or commenting on content; various types of observation actions, such as accessing or viewing profile pages, media, or other suitable content; various types of coincidence information about two or more social-graph entities, such as being in the same group, tagged in the same photograph, checked-in at the same location, or attending the same event; or other suitable actions. Although this disclosure describes measuring affinity in a particular manner, this disclosure contemplates measuring affinity in any suitable manner.

In particular embodiments, networking system 602 may use a variety of factors to calculate a coefficient. These factors may include, for example, user actions, types of relationships between objects, location information, other suitable factors, or any combination thereof. In particular embodiments, different factors may be weighted differently when calculating the coefficient. The weights for each factor may be static or the weights may change according to, for example, the user, the type of relationship, the type of action, the user's location, and so forth. Ratings for the factors may be combined according to their weights to determine an overall coefficient for the user. As an example and not by way of limitation, particular user actions may be assigned both a rating and a weight while a relationship associated with the particular user action is assigned a rating and a correlating weight (e.g., so the weights total 100%). To calculate the coefficient of a user towards a particular object, the rating assigned to the user's actions may comprise, for example, 60% of the overall coefficient, while the relationship between the user and the object may comprise 40% of the overall coefficient. In particular embodiments, the networking system 602 may consider a variety of variables when determining weights for various factors used to calculate a coefficient, such as, for example, the time since information was accessed, decay factors, frequency of access, relationship to information or relationship to the object about which information was accessed, relationship to social-graph entities connected to the object, short- or long-term averages of user actions, user feedback, other suitable variables, or any combination thereof. As an example and not by way of limitation, a coefficient may include a decay factor that causes the strength of the signal provided by particular actions to decay with time, such that more recent actions are more relevant when calculating the coefficient. The ratings and weights may be continuously updated based on continued tracking of the actions upon which the coefficient is based. Any type of process or algorithm may be employed for assigning, combining, averaging, and so forth the ratings for each factor and the weights assigned to the factors. In particular embodiments, networking system 602 may determine coefficients using machine-learning algorithms trained on historical actions and past user responses, or data farmed from users by exposing them to various options and measuring responses. Although this disclosure describes calculating coefficients in a particular manner, this disclosure contemplates calculating coefficients in any suitable manner.

In particular embodiments, networking system 602 may calculate a coefficient based on a user's actions. Networking system 602 may monitor such actions on the online social network, on a third-party system 608, on other suitable systems, or any combination thereof. Any suitable type of user actions may be tracked or monitored. Typical user actions include viewing profile pages, creating or posting content, interacting with content, joining groups, listing and confirming attendance at events, checking-in at locations, liking particular pages, creating pages, and performing other tasks that facilitate social action. In particular embodiments, networking system 602 may calculate a coefficient based on the user's actions with particular types of content. The content may be associated with the online social network, a third-party system 608, or another suitable system. The content may include users, profile pages, posts, news stories, headlines, instant messages, chat room conversations, emails, advertisements, pictures, video, music, other suitable objects, or any combination thereof. Networking system 602 may analyze a user's actions to determine whether one or more of the actions indicate an affinity for subject matter, content, other users, and so forth. As an example and not by way of limitation, if a user may make frequently posts content related to "coffee" or variants thereof, networking system 602 may determine the user has a high coefficient with respect to the concept "coffee". Particular actions or types of actions may be assigned a higher weight and/or rating than other actions, which may affect the overall calculated coefficient. As an example and not by way of limitation, if a first user emails a second user, the weight or the rating for the action may be higher than if the first user simply views the user-profile page for the second user.

In particular embodiments, networking system 602 may calculate a coefficient based on the type of relationship between particular objects. Referencing the social graph 700, networking system 602 may analyze the number and/or type of edges 706 connecting particular user nodes 702 and concept nodes 704 when calculating a coefficient. As an example and not by way of limitation, user nodes 702 that are connected by a spouse-type edge (representing that the two users are married) may be assigned a higher coefficient than a user node 702 that are connected by a friend-type edge. In other words, depending upon the weights assigned to the actions and relationships for the particular user, the overall affinity may be determined to be higher for content about the user's spouse than for content about the user's friend. In particular embodiments, the relationships a user has with another object may affect the weights and/or the ratings of the user's actions with respect to calculating the coefficient for that object. As an example and not by way of limitation, if a user is tagged in first photo, but merely likes a second photo, networking system 602 may determine that the user has a higher coefficient with respect to the first photo than the second photo because having a tagged-in-type relationship with content may be assigned a higher weight and/or rating than having a like-type relationship with content. In particular embodiments, networking system 602 may calculate a coefficient for a first user based on the relationship one or more second users have with a particular object. In other words, the connections and coefficients other users have with an object may affect the first user's coefficient for the object. As an example and not by way of limitation, if a first user is connected to or has a high coefficient for one or more second users, and those second users are connected to or have a high coefficient for a particular object, networking system 602 may determine that the first user should also have a relatively high coefficient for the particular object. In particular embodiments, the coefficient may be based on the degree of separation between particular objects. The lower coefficient may represent the decreasing likelihood that the first user will share an interest in content objects of the user that is indirectly connected to the first user in the social graph 700. As an example and not by way of limitation, social-graph entities that are closer in the social graph 700 (i.e., fewer degrees of separation) may have a higher coefficient than entities that are further apart in the social graph 700.

In particular embodiments, networking system 602 may calculate a coefficient based on location information. Objects that are geographically closer to each other may be considered to be more related, or of more interest, to each other than more distant objects. In particular embodiments, the coefficient of a user towards a particular object may be based on the proximity of the object's location to a current location associated with the user (or the location of a client device 606 of the user). A first user may be more interested in other users or concepts that are closer to the first user. As an example and not by way of limitation, if a user is one mile from an airport and two miles from a gas station, networking system 602 may determine that the user has a higher coefficient for the airport than the gas station based on the proximity of the airport to the user.

In particular embodiments, networking system 602 may perform particular actions with respect to a user based on coefficient information. Coefficients may be used to predict whether a user will perform a particular action based on the user's interest in the action. A coefficient may be used when generating or presenting any type of objects to a user, such as advertisements, search results, news stories, media, messages, notifications, or other suitable objects. The coefficient may also be utilized to rank and order such objects, as appropriate. In this way, networking system 602 may provide information that is relevant to user's interests and current circumstances, increasing the likelihood that they will find such information of interest. In particular embodiments, networking system 602 may generate content based on coefficient information. Content objects may be provided or selected based on coefficients specific to a user. As an example and not by way of limitation, the coefficient may be used to generate media for the user, where the user may be presented with media for which the user has a high overall coefficient with respect to the media object. As another example and not by way of limitation, the coefficient may be used to generate advertisements for the user, where the user may be presented with advertisements for which the user has a high overall coefficient with respect to the advertised object. In particular embodiments, networking system 602 may generate search results based on coefficient information. Search results for a particular user may be scored or ranked based on the coefficient associated with the search results with respect to the querying user. As an example and not by way of limitation, search results corresponding to objects with higher coefficients may be ranked higher on a search-results page than results corresponding to objects having lower coefficients.

In particular embodiments, networking system 602 may calculate a coefficient in response to a request for a coefficient from a particular system or process. To predict the likely actions a user may take (or may be the subject of) in a given situation, any process may request a calculated coefficient for a user. The request may also include a set of weights to use for various factors used to calculate the coefficient. This request may come from a process running on the online social network, from a third-party system 608 (e.g., via an API or other communication channel), or from another suitable system. In response to the request, networking system 602 may calculate the coefficient (or access the coefficient information if it has previously been calculated and stored). In particular embodiments, networking system 602 may measure an affinity with respect to a particular process. Different processes (both internal and external to the online social network) may request a coefficient for a particular object or set of objects. Networking system 602 may provide a measure of affinity that is relevant to the particular process that requested the measure of affinity. In this way, each process receives a measure of affinity that is tailored for the different context in which the process will use the measure of affinity.

In connection with social-graph affinity and affinity coefficients, particular embodiments may utilize one or more systems, components, elements, functions, methods, operations, or steps disclosed in U.S. patent application Ser. No. 11/503,093, filed 11 Aug. 2006, U.S. patent application Ser. No. 12/977,027, filed 22 Dec. 2010, U.S. patent application Ser. No. 12/978,265, filed 23 Dec. 2010, and U.S. patent application Ser. No. 13/632,869, field 1 Oct. 2012, each of which is incorporated by reference.

In particular embodiments, one or more of the content objects of the online social network may be associated with a privacy setting. The privacy settings (or "access settings") for an object may be stored in any suitable manner, such as, for example, in association with the object, in an index on an authorization server, in another suitable manner, or any combination thereof. A privacy setting of an object may specify how the object (or particular information associated with an object) can be accessed (e.g., viewed or shared) using the online social network. Where the privacy settings for an object allow a particular user to access that object, the object may be described as being "visible" with respect to that user. As an example and not by way of limitation, a user of the online social network may specify privacy settings for a user-profile page identify a set of users that may access the work experience information on the user-profile page, thus excluding other users from accessing the information. In particular embodiments, the privacy settings may specify a "blocked list" of users that should not be allowed to access certain information associated with the object. In other words, the blocked list may specify one or more users or entities for which an object is not visible. As an example and not by way of limitation, a user may specify a set of users that may not access photos albums associated with the user, thus excluding those users from accessing the photo albums (while also possibly allowing certain users not within the set of users to access the photo albums). In particular embodiments, privacy settings may be associated with particular social-graph elements. Privacy settings of a social-graph element, such as a node or an edge, may specify how the social-graph element, information associated with the social-graph element, or content objects associated with the social-graph element can be accessed using the online social network. As an example and not by way of limitation, a particular concept node 704 corresponding to a particular photo may have a privacy setting specifying that the photo may only be accessed by users tagged in the photo and their friends. In particular embodiments, privacy settings may allow users to opt in or opt out of having their actions logged by networking system 602 or shared with other systems (e.g., third-party system 608). In particular embodiments, the privacy settings associated with an object may specify any suitable granularity of permitted access or denial of access. As an example and not by way of limitation, access or denial of access may be specified for particular users (e.g., only me, my roommates, and my boss), users within a particular degrees-of-separation (e.g., friends, or friends-of-friends), user groups (e.g., the gaming club, my family), user networks (e.g., employees of particular employers, students or alumni of particular university), all users ("public"), no users ("private"), users of third-party systems 608, particular applications (e.g., third-party applications, external websites), other suitable users or entities, or any combination thereof. Although this disclosure describes using particular privacy settings in a particular manner, this disclosure contemplates using any suitable privacy settings in any suitable manner.

In particular embodiments, one or more servers may be authorization/privacy servers for enforcing privacy settings. In response to a request from a user (or other entity) for a particular object stored in a data store, networking system 602 may send a request to the data store for the object. The request may identify the user associated with the request and may only be sent to the user (or a client device 606 of the user) if the authorization server determines that the user is authorized to access the object based on the privacy settings associated with the object. If the requesting user is not authorized to access the object, the authorization server may prevent the requested object from being retrieved from the data store, or may prevent the requested object from be sent to the user. In the search query context, an object may only be generated as a search result if the querying user is authorized to access the object. In other words, the object must have a visibility that is visible to the querying user. If the object has a visibility that is not visible to the user, the object may be excluded from the search results. Although this disclosure describes enforcing privacy settings in a particular manner, this disclosure contemplates enforcing privacy settings in any suitable manner.

The foregoing specification is described with reference to specific exemplary embodiments thereof. Various embodiments and aspects of the disclosure are described with reference to details discussed herein, and the accompanying drawings illustrate the various embodiments. The description above and drawings are illustrative and are not to be construed as limiting. Numerous specific details are described to provide a thorough understanding of various embodiments.

The additional or alternative embodiments may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

We claim:

1. A method comprising:
   determining that a client-computing device is actively playing a digital video, wherein the digital video comprises a first insertion point and a second insertion point;
   while the client-computing device is actively playing a portion of the digital video before the first insertion point:
      identifying digital content for the first insertion point of the digital video;
      determining a predicted total value of the digital content at the first insertion point; and
      performing a comparison between the predicted total value of the digital content at the first insertion point and a predicted engagement loss associated with providing the digital content at the first insertion point within the digital video;
   based on the predicted engagement loss associated with providing the digital content at the first insertion point outweighing the predicted total value of the digital content at the first insertion point, skipping the first insertion point by not adding any digital content at the first insertion point; and
   while the client-computing device is actively playing a portion of the digital video before the second insertion point:
      determining a predicted total value of the digital content at the second insertion point; and
      performing a comparison between the predicted total value of the digital content at the second insertion point and a predicted engagement loss associated with providing the digital content at the second insertion point within the digital video; and
   based on the predicted total value of the digital content at the second insertion point outweighing the predicted engagement loss associated with providing the digital content at the second insertion point, providing for display to the client-computing device the digital content at the second insertion point of the digital video.

2. The method as recited in claim 1, wherein determining the predicted total value of the digital content at the first insertion point further comprises:
   generating a predicted revenue value associated with the digital content;
   generating a predicted organic value associated with the digital content, wherein the predicted organic value comprises a measure of improved sentiment to a user of the client-computing device actively playing the digital video resulting from inserting the digital content; and
   determining the predicted total value of the digital content based on the predicted revenue value associated with the digital content and the predicted organic value associated with the digital content.

3. The method as recited in claim 2, further comprising determining the predicted engagement loss associated with providing the digital content at the first insertion point within the digital video by:
   identifying an estimated digital content completion rate;
   identifying a predicted watch time loss associated with providing the digital content for display at the first insertion point of the digital video; and
   determining the predicted engagement loss based on the estimated digital content completion rate and the predicted watch time loss associated with providing the digital content for display at the first insertion point of the digital video.

4. The method as recited in claim 3, wherein identifying the estimated digital content completion rate is based on:
   analyzing networking system information associated with the user of the client-computing device to determine a rate at which the user watches digital videos and a rate at which the user watches digital content inserted into digital videos.

5. The method as recited in claim 2, wherein generating the predicted revenue value associated with the digital content comprises:
   identifying a raw bid associated with the digital content;
   determining an expected completion rate associated with the digital content; and
   generating the predicted revenue value based on the identified raw bid associated with the digital content and the determined expected completion rate associated with the digital content.

6. The method of claim 3, wherein identifying the predicted watch time loss associated with providing the digital content for display at the first insertion point of the digital video is based on analyzing a measure of correlation between the actively playing digital content and networking system activity history of the user of the client-computing device.

7. The method as recited in claim 1, further comprising, in response to providing the digital content at the second insertion point of the digital video, receiving playback information from the client-computing device.

8. The method as recited in claim 7, further comprising utilizing the received playback information to train one or more machine learning models to generate at least one of: one or more digital content completion rates or one or more watch time losses.

9. A system comprising:
at least one processor; and
at least one non-transitory computer-readable storage medium storing instructions thereon that, when executed by the at least one processor, cause the system to:
  determine that a client-computing device is providing a digital video for display, wherein the digital video comprises a first insertion point and a second insertion point;
  while the client-computing device is providing a portion of the digital video before the first insertion point for display:
    identify digital content for the first insertion point of the digital video;
    determine a predicted total value of the digital content at the first insertion point; and
    perform a comparison between the predicted total value of the digital content at the first insertion point and a predicted engagement loss associated with providing the digital content at the first insertion point within the digital video;
  based on the predicted engagement loss associated with providing the digital content at the first insertion point outweighing the predicted total value of the digital content at the first insertion point, skip the first insertion point by not adding any digital content at the first insertion point; and
  while the client-computing device is actively playing a portion of the digital video before the second insertion point:
    determine a predicted total value of the digital content at the second insertion point; and
    perform a comparison between the predicted total value of the digital content at the second insertion point and a predicted engagement loss associated with providing the digital content at the second insertion point within the digital video; and
    based on the predicted total value of the digital content at the second insertion point outweighing the predicted engagement loss associated with providing the digital content at the second insertion point, provide for display to the client-computing device the digital content at the second insertion point of the digital video.

10. The system as recited in claim 9, further storing instructions thereon that, when executed by the at least one processor, cause the system to further determine the predicted total value of the digital content at the first insertion point by:
  generating a predicted revenue value associated with the digital content;
  generating a predicted organic value associated with the digital content, wherein the predicted organic value comprises a measure of improved sentiment to a user of the client-computing device actively playing the digital video; and
  determining the predicted total value of the digital content based on the predicted revenue value associated with the digital content and the predicted organic value associated with the digital content.

11. The system as recited in claim 10, wherein generating the predicted revenue value associated with the digital content comprises:
  identifying a raw bid associated with the digital content;
  determining an expected completion rate associated with the digital content; and
  generating the predicted revenue value based on the identified raw bid associated with the digital content and the determined expected completion rate associated with the digital content.

12. The system as recited in claim 10, wherein generating the predicted organic value associated with the digital content comprises determining a likelihood that the user of the client-computing device will exit playback of the digital content prior to completion of the digital content by analyzing one or more of: historical data associated with the digital content or a fit between the user of the client-computing device and the digital content.

13. The system as recited in claim 10, further storing instructions thereon that, when executed by the at least one processor, cause the system to determine the predicted engagement loss associated with providing the digital content at the first insertion point within the digital video by:
  generating a predicted digital content completion rate;
  generating a predicted watch time loss associated with providing the digital content for display at the first insertion point of the digital video; and
  determining the predicted engagement loss based on the predicted digital content completion rate and the predicted watch time loss associated with providing the digital content for display at the first insertion point of the digital video.

14. The system as recited in claim 13,
further storing instructions thereon that, when executed by the at least one processor, cause the system to:
  receive, from the client-computing device, an indication of a selection of the digital video for viewing; and
  in response to receiving the indication of the selection, identify the first insertion point and the second insertion point in the digital video based on analyzing contents of the digital video to determine at least one of a scene break, a transition point, or a dialog break.

15. The system as recited in claim 14, further storing instructions thereon that, when executed by the at least one processor, cause the system to, in response to providing the digital content at the second insertion point of the digital video, receive playback information from the client-computing device.

16. The system as recited in claim 15, further storing instructions thereon that, when executed by the at least one processor, cause the system to utilize the received playback information to train one or more machine learning models to generate at least one of: one or more digital content completion rates or one or more watch time losses.

17. A non-transitory computer-readable medium storing instructions thereon that, when executed by at least one processor, cause a computer system to:
  determine that a client-computing device is actively playing a digital video, wherein the digital video comprises a first insertion point and a second insertion point;
  while the client-computing device is actively playing a portion of the digital video before the first insertion point:
    identify digital content for the first insertion point of the digital video;
    determine a predicted total value of the digital content at the first insertion point; and
    perform a comparison between a predicted total value of the digital content at the first insertion point and a predicted engagement loss associated with providing the digital content at the first insertion point within the digital video;

based on the predicted engagement loss associated with providing the digital content at the first insertion point outweighing the predicted total value of the digital content at the first insertion point, skip the first insertion point by not adding any digital content at the first insertion point; and while the client-computing device is actively playing a portion of the digital video before the second insertion point:
 determine a predicted total value of the digital content at the second insertion point; and
 perform a comparison between the predicted total value of the digital content at the second insertion point and a predicted engagement loss associated with providing the digital content at the second insertion point within the digital video; and based on the predicted total value of the digital content at the second insertion point outweighing the predicted engagement loss associated with providing the digital content at the second insertion point, provide for display to the client-computing device the digital content at the second insertion point of the digital video.

18. The non-transitory computer-readable medium as recited in claim 17, further storing instructions thereon that, when executed by the at least one processor, cause the computer system to further determine the predicted total value of the digital content at the first insertion point by:
 generating a predicted revenue value associated with the digital content by:
 identifying a raw bid associated with the digital content;
 determining an expected completion rate associated with the digital content; and
 generating the predicted revenue value based on the identified raw bid associated with the digital content and the determined expected completion rate associated with the digital content;
 generating a predicted organic value associated with the digital content, wherein the predicted organic value comprises a measure of improved sentiment to a user of the client-computing device actively playing the digital video; and
 determining the predicted total value of the digital content based on the predicted revenue value associated with the digital content and the predicted organic value associated with the digital content.

19. The non-transitory computer-readable medium as recited in claim 17, further storing instructions thereon that, when executed by the at least one processor, cause the computer system to:
 determine that current playback of the digital video is a threshold amount of time from the second insertion point; and
 in response to determining that current playback of the digital video is the threshold amount of time from the second insertion point and based on the predicted total value of the digital content at the second insertion point outweighing the predicted engagement loss associated with providing the digital content at the second insertion point, overlay on a portion of the digital video an indicator that playback of the digital content will begin in the threshold amount of time.

20. The non-transitory computer-readable medium as recited in claim 19, further storing instructions thereon that, when executed by the at least one processor, cause the computer system to generate the first insertion point in the digital video at a point beyond a predetermined percentage of image frames in the digital video.

* * * * *